US011169880B1

(12) United States Patent
Shatsky

(10) Patent No.: US 11,169,880 B1
(45) Date of Patent: Nov. 9, 2021

(54) STORAGE SYSTEM CONFIGURED TO GUARANTEE SUFFICIENT CAPACITY FOR A DISTRIBUTED RAID REBUILD PROCESS

(71) Applicant: EMC IP Holding Company LLC, Hopkinton, MA (US)

(72) Inventor: Yosef Shatsky, Karnei Shomron (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 24 days.

(21) Appl. No.: 16/902,890

(22) Filed: Jun. 16, 2020

Related U.S. Application Data

(63) Continuation-in-part of application No. 16/852,632, filed on Apr. 20, 2020.

(51) Int. Cl.
  *G06F 11/10* (2006.01)
  *G06F 11/14* (2006.01)
  (Continued)

(52) U.S. Cl.
  CPC .......... *G06F 11/1076* (2013.01); *G06F 3/064* (2013.01); *G06F 3/0619* (2013.01);
  (Continued)

(58) Field of Classification Search
  CPC ............. G06F 11/0772; G06F 11/0766; G06F 11/0751; G06F 3/0683–0688; G06F 3/0689; G06F 3/0619
  See application file for complete search history.

(56) References Cited

U.S. PATENT DOCUMENTS 7,165,155 B1   1/2007  Duprey et al.
7,440,982 B2  10/2008  Lu et al.
(Continued)

FOREIGN PATENT DOCUMENTS

WO       2016111954 A1   7/2016
WO  PCT/US2019/024885    1/2020
WO  PCT/US2019/024900    1/2020

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Yolanda L Wilson
(74) *Attorney, Agent, or Firm* — Ryan, Mason & Lewis, LLP

(57) ABSTRACT

A storage system comprises a plurality of storage devices, and is configured to establish a redundant array of independent disks (RAID) arrangement comprising a plurality of stripes, with each of the plurality of stripes comprising a plurality of blocks, the blocks being distributed across multiple ones of the storage devices. In conjunction with establishment of the RAID arrangement, the storage system is further configured, for each of the plurality of stripes, to designate multiple ones of the storage devices as respective spare devices for that stripe, and for each of the storage devices, to determine numbers of the stripes for which that storage device is designated as a spare device for respective ones of the other storage devices in each of multiple spare levels and for each of multiple failure combinations. A particular number of spare blocks is reserved for each of the storage devices using the determined numbers.

20 Claims, 16 Drawing Sheets

(51) Int. Cl.
  *G06F 3/06* (2006.01)
  *G06F 11/16* (2006.01)
(52) U.S. Cl.
  CPC ........ *G06F 3/0689* (2013.01); *G06F 11/1435* (2013.01); *G06F 11/1489* (2013.01); *G06F 11/1658* (2013.01)

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,099,623 | B1* | 1/2012 | Li ................. G06F 11/1084 714/6.22 |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 10,684,915 | B2 | 6/2020 | Schneider et al. |
| 2003/0088803 | A1* | 5/2003 | Arnott ................ G06F 11/10 714/5.11 |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2012/0254508 | A1* | 10/2012 | Walls ................ G06F 3/0688 711/103 |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0046359 | A1* | 2/2017 | Sahasrabudhe ......... G06F 11/00 |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2017/0315745 | A1* | 11/2017 | Agombar .............. G06F 3/0689 |
| 2018/0088857 | A1* | 3/2018 | Gao ................... G06F 11/2094 |
| 2018/0095873 | A1* | 4/2018 | Nakagoe ................ G06F 12/16 |
| 2019/0220213 | A1* | 7/2019 | Sun ..................... G06F 3/0644 |
| 2019/0303490 | A1 | 10/2019 | Chen et al. |
| 2019/0391889 | A1* | 12/2019 | Luo ..................... G06F 3/0631 |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. filed Jul. 28, 2017, and entitled "Token-Based Data Flow Control in a Clustered Storage System."

U.S. Appl. No. 15/793,121 filed in the name of David Meiri et al. filed Oct. 25, 2017, and entitled "Opportunistic Compression of Replicated Data in a Content Addressable Storage System."

U.S. Appl. No. 15/824,536 filed in the name of Christopher Sayles et al. filed Nov. 28, 2017, and entitled "Storage System with Asynchronous Messaging between Processing Modules for Data Replication."

U.S. Appl. No. 16/253,793 filed in the name of Yuval Harduf et al. filed Jan. 22, 2019, and entitled "Storage System with Data Consistency Checking in Synchronous Replication Using Active Snapshot Set."

U.S. Appl. No. 16/265,131 filed in the name of Lior Kamran et al. filed Feb. 1, 2019, and entitled "Storage System with Write Cache Release Protection."

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. filed Apr. 29, 2019, and entitled "Storage System with Deduplication-Aware Replication Implemented Using a Standard Storage Command Protocol."

(56) References Cited

OTHER PUBLICATIONS

U.S. Appl. No. 16/413,050 filed in the name of Xiangping Chen et al. filed May 15, 2019, and entitled "Storage System with Coordinated Recovery across Multiple Input-Output Journals of Different Types."
U.S. Appl. No. 16/530,121 filed in the name of Anton Kucherov et al. filed Aug. 2, 2019, and entitled "Memory-Efficient Processing of Raid Metadata Bitmaps."
U.S. Appl. No. 16/663,524 filed in the name of Xiangping Chen et al. filed Oct. 25, 2019, and entitled "Storage System with Throughput-Based Timing of Synchronous Replication Recovery."
U.S. Appl. No. 16/665,651 filed in the name of Lior Kamran et al. filed Oct. 28, 2019, and entitled "Recovery Flow with Reduced Address Lock Contention in a Content Addressable Storage System."
U.S. Appl. No. 16/671,824 filed in the name of Lior Kamran et al. filed Nov. 1, 2019, and entitled "Storage System Capacity Expansion Using Mixed-Capacity Storage Devices."
U.S. Appl. No. 16/693,858 filed in the name of Doron Tal filed Nov. 25, 2019, and entitled "Storage System with Prioritized RAID Rebuild."
U.S. Appl. No. 16/793,163 filed in the name of Yosef Shatsky et al. filed Feb. 18, 2020, and entitled "Storage System with Efficient Data and Parity Distribution Across Mixed-Capacity Storage Devices."

\* cited by examiner

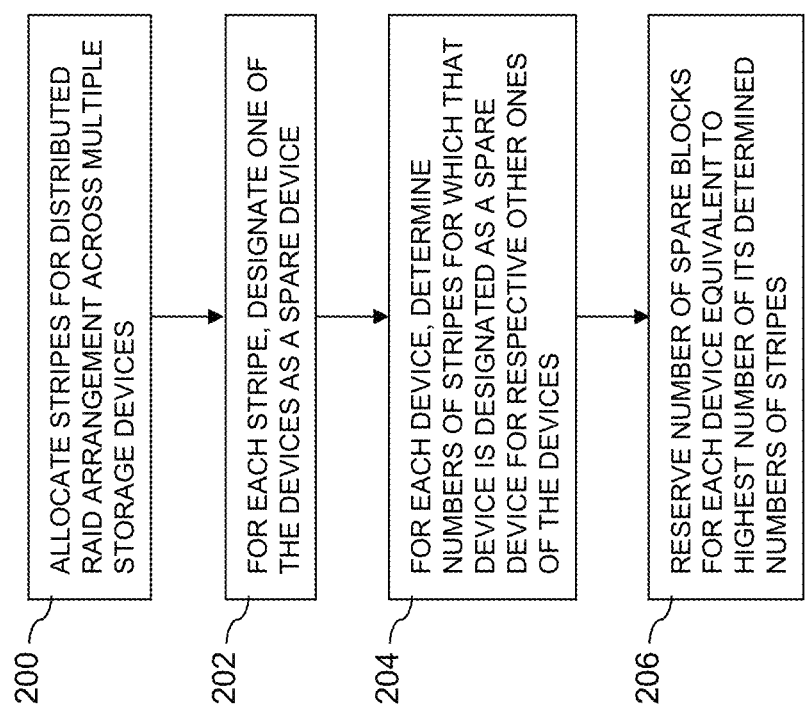

| # | D1 | D2 | D3 | D4 | D5 | Σ |
|---|----|----|----|----|----|---|
| 1 | 1 | | 1 | 1 | 1 | |
| 2 | | 1 | | 1 | | |
| 3 | 1 | 1 | 1 | | 1 | |
| 4 | 1 | 1 | 1 | 1 | | |
| 5 | | | 1 | | 1 | |
| 6 | 1 | 1 | 1 | | 1 | |
| 7 | 1 | 1 | 1 | | | |
| 8 | | 1 | 1 | 1 | 1 | |
| 9 | 1 | 1 | | 1 | | |
| 10 | 1 | 1 | 1 | 1 | 1 | |
| 11 | 1 | 1 | 1 | 1 | | |
| 12 | 1 | 1 | 1 | 1 | 1 | |
| 13 | 1 | | 1 | 1 | 1 | |
| Σ | 8 | 8 | 8 | 8 | 7 | |

FIG. 3A

| # | D1 | D2 | D3 | D4 | D5 | Σ |
|---|----|----|----|----|----|---|
| 1 | 1 | | 1 | 1 | 1 | |
| 2 | × | 1 | | 1 | | |
| 3 | 1 | 1 | 1 | × | 1 | |
| 4 | 1 | 1 | 1 | 1 | × | |
| 5 | | | 1 | | 1 | |
| 6 | 1 | 1 | 1 | | 1 | |
| 7 | 1 | 1 | × | | 1 | |
| 8 | × | 1 | 1 | 1 | × | |
| 9 | 1 | 1 | | 1 | | |
| 10 | 1 | 1 | × | 1 | 1 | |
| 11 | 1 | 1 | 1 | 1 | | |
| 12 | 1 | 1 | 1 | 1 | 1 | |
| 13 | 1 | | 1 | 1 | 1 | |
| Σ | 8 | 8 | 8 | 8 | 7 | |

FIG. 3B

| # | D1 | D2 | D3 | D4 | D5 | Spare |
|---|----|----|----|----|----|-------|
| 1 |    |    |    |    |    | D5 |
| 2 | 1  | 1  |    | 1  | 1  | D1 |
| 3 | 1  | 1  | 1  |    | 1  | D4 |
| 4 |    |    |    |    |    | D2 |
| 5 | 1  |    | 1  | 1  | 1  | D1 |
| 6 | 1  | 1  |    | 1  | 1  | D2 |
| 7 | 1  | 1  | 1  |    | 1  | D3 |
| 8 |    | 1  | 1  | 1  |    | D4 |
| 9 |    | 1  | 1  | 1  |    | D5 |
| 10| 1  |    |    | 1  | 1  | D3 |
| 11|    | 1  | 1  | 1  |    | D3 |
| 12| 1  |    | 1  | 1  | 1  | D5 |
| 13| 1  |    | 1  | 1  | 1  | D2 |
| Σ | 8  | 8  | 8  | 8  | 7  |    |

FIG. 4

| Source | | | | | Spare | |
|---|---|---|---|---|---|---|
| D1 | D2 | D3 | D4 | D5 | Device | Blocks |
| 0 | 2 | 1 | 2 | 1 | D1 | 2 |
| 3 | 0 | 2 | 1 | 3 | D2 | 3 |
| 2 | 3 | 0 | 2 | 2 | D3 | 3 |
| 1 | 2 | 2 | 0 | 1 | D4 | 2 |
| 2 | 1 | 3 | 3 | 0 | D5 | 3 |

FIG. 5

| # | D1 | D2 | D3 | D4 | D5 | Spare |
|---|----|----|----|----|----|-------|
| 1 | 1 |  | 1 | 1 | 1 | D5 |
| 2 | x | 1 |  | 1 | 1 | D1 |
| 3 | 1 | 1 | 1 | x | 1 | D4 |
| 4 | 1 | 1 | 1 | 1 | 1 | D2 |
| 5 | x | 1 | 1 | 1 | 1 | D1 |
| 6 | 1 | 1 | 1 |  | 1 | D2 |
| 7 | 1 | 1 | x | 1 | 1 | D3 |
| 8 |  | 1 | 1 | x | 1 | D4 |
| 9 | 1 | 1 | 1 | 1 | x | D5 |
| 10 | 1 | 1 | x | 1 | 1 | D3 |
| 11 | 1 | 1 | x | 1 | 1 | D3 |
| 12 | 1 | 1 | 1 | 1 | 1 | D5 |
| 13 | 1 | 1 | 1 | 1 | 1 | D2 |
| Σ | 8 | 8 | 8 | 8 | 7 | |

|  | D1 | D2 | D3 | D4 | D5 | D6 | Total |
|---|---|---|---|---|---|---|---|
| Used | 4 | 0 | 6 | 5 | 0 | 5 | 20 |
| Reserved | 6 | 5 | 6 | 7 | 7 | 7 | 38 |

| Fail | Single Failure Spare | | | | | |
|---|---|---|---|---|---|---|
| | D1 | D2 | D3 | D4 | D5 | D6 |
| D1 |  | 1 | 3 | 3 | 2 | 1 |
| D2 | 2 |  | 1 | 3 | 1 | 3 |
| D3 | 2 | 2 |  | 2 | 1 | 3 |
| D4 | 1 | 2 | 1 |  | 3 | 3 |
| D5 | 1 | 2 | 2 | 3 |  | 2 |
| D6 | 3 | 2 | 2 | 1 | 2 |  |
| MAX | 3 | 2 | 3 | 3 | 3 | 3 |
| N1 | 2 | 1 | 4 | 6 | 3 | 4 |
| N2 | 3 | 4 | 1 | 2 | 4 | 6 |
| N3 | 4 | 4 | 4 | 4 | 2 | 2 |
| MAX | 4 | 4 | 4 | 6 | 4 | 6 |

| Fail | | First Spare Level | | | | | | Second Spare Level | | | | | | Dual Failure Spare | | | | | |
|---|---|---|---|---|---|---|---|---|---|---|---|---|---|---|---|---|---|---|---|
| 1 | 2 | D1 | D2 | D3 | D4 | D5 | D6 | D1 | D2 | D3 | D4 | D5 | D6 | D1 | D2 | D3 | D4 | D5 | D6 |
| N1 | D3 | | | | 4 | 3 | 3 | | | | 3 | 2 | 2 | | | | 7 | 5 | 5 |
| N1 | D4 | | | 3 | | 3 | 3 | | | 4 | | 2 | 1 | | | 7 | | 5 | 4 |
| N1 | D5 | | | 3 | 4 | | 3 | | | 1 | 2 | | 3 | | | 4 | 6 | | 6 |
| N1 | D6 | | | 3 | 4 | 3 | | | | 3 | 1 | 4 | | | | 6 | 5 | 7 | |
| N2 | D1 | | 4 | | | 3 | 3 | | 3 | | | 2 | 1 | | 7 | | | 5 | 4 |
| N2 | D2 | 3 | | | | 3 | 3 | 2 | | | | 2 | 2 | 6 | | | | 5 | 5 |
| N2 | D5 | 3 | 4 | | | | 3 | 1 | 2 | | | | 4 | 5 | 6 | | | | 6 |
| N2 | D6 | 3 | 4 | | | 3 | | 2 | 1 | | | 4 | | 4 | 5 | | | 7 | |
| N3 | D1 | | 4 | 3 | | 3 | 3 | | 3 | 2 | | 2 | 1 | | 7 | 5 | | 5 | 4 |
| N3 | D2 | 3 | | 3 | 4 | 3 | 3 | 1 | | 2 | 1 | 2 | 2 | 4 | | 5 | 5 | 5 | 5 |
| N3 | D3 | 3 | 4 | | 4 | 3 | 3 | 2 | 1 | | 3 | 2 | 2 | 5 | 6 | | 7 | 5 | 6 |
| N3 | D4 | 3 | 4 | 3 | | 3 | 3 | 2 | 2 | 3 | | 2 | 2 | 5 | 6 | 7 | | 7 | 6 |
| MAX | | 3 | 4 | 3 | 4 | 3 | 3 | 3 | 3 | 4 | 3 | 4 | 3 | 6 | 7 | 7 | 7 | 7 | 6 |

STORAGE SYSTEM CONFIGURED TO GUARANTEE SUFFICIENT CAPACITY FOR A DISTRIBUTED RAID REBUILD PROCESS

RELATED APPLICATION(S)

The present application is a continuation-in-part of U.S. patent application Ser. No. 16/852,632, filed Apr. 20, 2020 and entitled "Storage System Configured to Guarantee Sufficient Capacity for a Distributed Raid Rebuild Process," which is incorporated by reference herein in its entirety.

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt using parity information, typically in response to a storage device failure or other type of failure within the storage system. For example, a RAID 6 arrangement uses "dual parity" and can recover from simultaneous failure of two storage devices of the storage system. These and other RAID arrangements provide redundancy for stored data, with different types of RAID arrangements providing different levels of redundancy. Storage systems that utilize such RAID arrangements are typically configured to perform a rebuild process after detection of a storage device failure, and once the rebuild process is completed, the storage system can sustain additional failures. Conventional RAID techniques of this type can be problematic in certain situations.

For example, in distributed RAID arrangements, in which the total number of blocks per stripe is less than the total number of storage devices across which the blocks are distributed, it is unduly difficult under conventional practice to ensure that there is sufficient available capacity to rebuild the blocks of one or more failed storage devices. Conventional approaches typically require the performance of complex calculations in order to determine a particular allocation of spare capacity across the multiple storage devices, or instead allocate excessive amounts of spare capacity to each device, which wastes storage device capacity and therefore degrades storage system performance.

A need therefore exists for an improved approach that can guarantee sufficient rebuild capacity without the need for complex calculations or wasted capacity, and yet is readily applicable to a wide variety of different RAID arrangements.

SUMMARY

Illustrative embodiments provide techniques for guaranteeing sufficient capacity for a distributed RAID rebuild process in a storage system. For example, some embodiments provide RAID arrangements in which spare blocks are reserved for storage devices in a manner that ensures that a rebuild process initiated responsive to a failure of one or more of the storage devices is guaranteed to have sufficient available storage device capacity to complete the rebuilding of the blocks of the one or more failed storage devices. Reserved capacity in some embodiments is shared at the storage device level, such that, for example, spare blocks reserved on one storage device can be used to rebuild blocks of different ones of the other storage devices in the event that one of those other storage devices were to fail.

Advantageously, such techniques in illustrative embodiments herein can guarantee sufficient capacity to complete the rebuild process, while also being computationally simple, as well as highly efficient in that only at or near minimum amounts of capacity need to be reserved for rebuild within the storage system.

Moreover, the disclosed techniques in illustrative embodiments overcome additional drawbacks of conventional approaches. For example, some embodiments can be used for any type of RAID arrangement, including those involving combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Illustrative embodiments disclosed herein provide efficient mechanisms to guarantee sufficient capacity in these and other situations in which allocation of blocks to stripes cannot be predetermined, and in numerous other demanding RAID arrangements, including those involving parity RAID techniques and/or non-parity RAID techniques.

In one embodiment, a storage system comprises a plurality of storage devices. The storage system is further configured to establish a RAID arrangement comprising a plurality of stripes, with each of the plurality of stripes comprising a plurality of blocks, the blocks being distributed across multiple ones of the storage devices. In conjunction with establishment of the RAID arrangement, the storage system is further configured, for each of the plurality of stripes, to designate multiple ones of the storage devices as respective spare devices for that stripe, and for each of the storage devices, to determine numbers of the stripes for which that storage device is designated as a spare device for respective ones of the other storage devices in each of multiple spare levels and for each of multiple failure combinations. A particular number of spare blocks is reserved for each of the storage devices based at least in part on the determined numbers of the stripes for which that storage device is designated as a spare device for respective ones of the other storage devices across the multiple spare levels and the multiple failure combinations.

In some embodiments, the RAID arrangement comprises a distributed RAID arrangement in which a total number of blocks per stripe is less than a total number of the storage devices over which the blocks of the plurality of stripes are distributed.

For example, the RAID arrangement can comprise at least one parity RAID arrangement supporting recovery from a failure of at least one of the plurality of storage devices, such as a RAID 5 arrangement supporting recovery from a failure of a single one of the plurality of storage devices, or a RAID 6 arrangement supporting recovery from simultaneous failure of up to two of the storage devices. In these and other parity RAID arrangements, each of the stripes illustratively comprises a plurality of data blocks and one or more parity blocks. Various combinations of parity RAID and/or non-parity RAID can also be used.

The storage system is illustratively configured to store stripe metadata indicating for each of the stripes the multiple ones of the storage devices that are designated as respective spare devices for that stripe. For example, the stripe metadata indicating for each of the stripes the multiple ones of the storage devices that are designated as respective spare devices for that stripe illustratively comprises an allocation table, the allocation table comprising a plurality of entries for respective ones of the stripes with each such entry comprising identifiers of the multiple storage devices that are designated as respective spare devices for that stripe.

Additionally or alternatively, the storage system is illustratively configured to store stripe metadata indicating for each of the storage devices the determined numbers of the stripes for which that storage device is designated as a spare device for respective ones of the other storage devices in each of multiple spare levels and for each of multiple failure combinations. For example, the stripe metadata indicating for each of the storage devices the determined numbers of the stripes for which that storage device is designated as a spare device for respective ones of the other storage devices in each of multiple spare levels and for each of multiple failure combinations illustratively comprises a reserve table, the reserve table comprising a plurality of entries for respective ones of the storage devices with each such entry comprising the determined numbers of the stripes for which that storage device is designated as a spare device for respective ones of the other storage devices in each of multiple spare levels and for each of multiple failure combinations.

Numerous other types and arrangements of one or more tables or other stripe metadata can be used in other embodiments.

In some embodiments, reserving a particular number of spare blocks for each of the storage devices based at least in part on the determined numbers of the stripes for which that storage device is designated as a spare device for respective ones of the other storage devices across the multiple spare levels and the multiple failure combinations comprises summing the determined numbers for the storage device across the spare levels to generate resulting sums for respective ones of the failure conditions, determining a highest one of the resulting sums across the respective ones of the failure conditions, and reserving a particular number of spare blocks for the storage device that is greater than or equal to the highest one of the resulting sums. Other techniques can be used in other embodiments to determine the particular number of spare blocks for a given storage device based at least in part on the determined numbers of the stripes for which that storage device is designated as a spare device for respective ones of the other storage devices across the multiple spare levels and the multiple failure combinations.

In some embodiments, designating multiple ones of the storage devices as respective spare devices for a given one of the stripes comprises designating at least first and second storage devices as respective first and second spare devices for the given stripe, with the first and second storage devices corresponding to respective first and second spare levels of the multiple spare levels. A first failure impacting the given stripe results in utilization of a spare block of the first spare device and a second failure impacting the given stripe results in utilization of a spare block of the second spare device.

The failure combinations in some embodiments comprise respective different sets of two or more of the storage devices.

In some embodiments, different ones of the storage devices are implemented on different ones of a plurality of storage nodes of a distributed storage system. In such an arrangement, the failure combinations may comprise, for example, different combinations of one of the storage devices and one of the nodes.

In some embodiments, the storage system is further configured to detect a failure of at least one of the storage devices, and responsive to the detected failure, to initiate a rebuild process to reconstruct blocks of the one or more failed storage devices utilizing the blocks of other ones of the storage devices. The rebuild process illustratively utilizes at least a subset of the reserved spare blocks of respective ones of the non-failed storage devices.

The reserved spare blocks in illustrative embodiments are sufficient in number to guarantee that a rebuild process initiated responsive to a failure of one or more of the storage devices has sufficient available storage device capacity to reconstruct the blocks of the one or more failed storage devices.

The storage system in some embodiments is implemented as a distributed storage system comprising a plurality of storage nodes, each storing data in accordance with a designated RAID arrangement, although it is to be appreciated that a wide variety of other types of storage systems can be used in other embodiments.

These and other illustrative embodiments include, without limitation, apparatus, systems, methods and processor-readable storage media.

BRIEF DESCRIPTION OF THE DRAWINGS

FIG. 2 is a flow diagram of a process for guaranteeing sufficient capacity for distributed RAID rebuild in an illustrative embodiment.

FIGS. 3A and 3B show an example of potential insufficient capacity for distributed RAID rebuild in an illustrative embodiment. These two figures are also collectively referred to herein as FIG. 3.

FIG. 4 shows an example of stripe metadata comprising an allocation table in which a spare device is allocated to each of a plurality of RAID stripes in an illustrative embodiment.

FIG. 5 shows an example of stripe metadata comprising a reserve table in which numbers of spare blocks are reserved for respective storage devices such that sufficient capacity is guaranteed for distributed RAID rebuild in an illustrative embodiment.

FIG. 6 shows an example of utilization of reserved spare blocks with guaranteed sufficient capacity for distributed RAID rebuild in an illustrative embodiment.

FIG. 8 shows an example of stripe metadata comprising an allocation table in which multiple spare devices are allocated to each of a plurality of RAID stripes in an illustrative embodiment.

FIG. 9 shows an example of stripe metadata comprising a reserve table in which numbers of spare blocks are reserved for respective storage devices such that sufficient capacity is guaranteed for distributed RAID rebuild in an illustrative embodiment.

FIG. 10 shows an example of utilization of reserved spare blocks with guaranteed sufficient capacity for distributed RAID rebuild in an illustrative embodiment.

FIG. 11 illustrates used spare capacity versus reserved spare capacity after failure of two storage devices in one embodiment.

FIG. 12 shows another example of stripe metadata comprising an allocation table in which multiple spare devices are allocated to each of a plurality of RAID stripes in an illustrative embodiment.

FIG. 13 shows an example of stripe metadata comprising a reserve table generated from the allocation table of FIG. 12 for the case of a single device or node failure.

FIG. 14 shows an example of stripe metadata comprising a reserve table generated from the allocation table of FIG. 12 for the case of a dual device and node failure.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
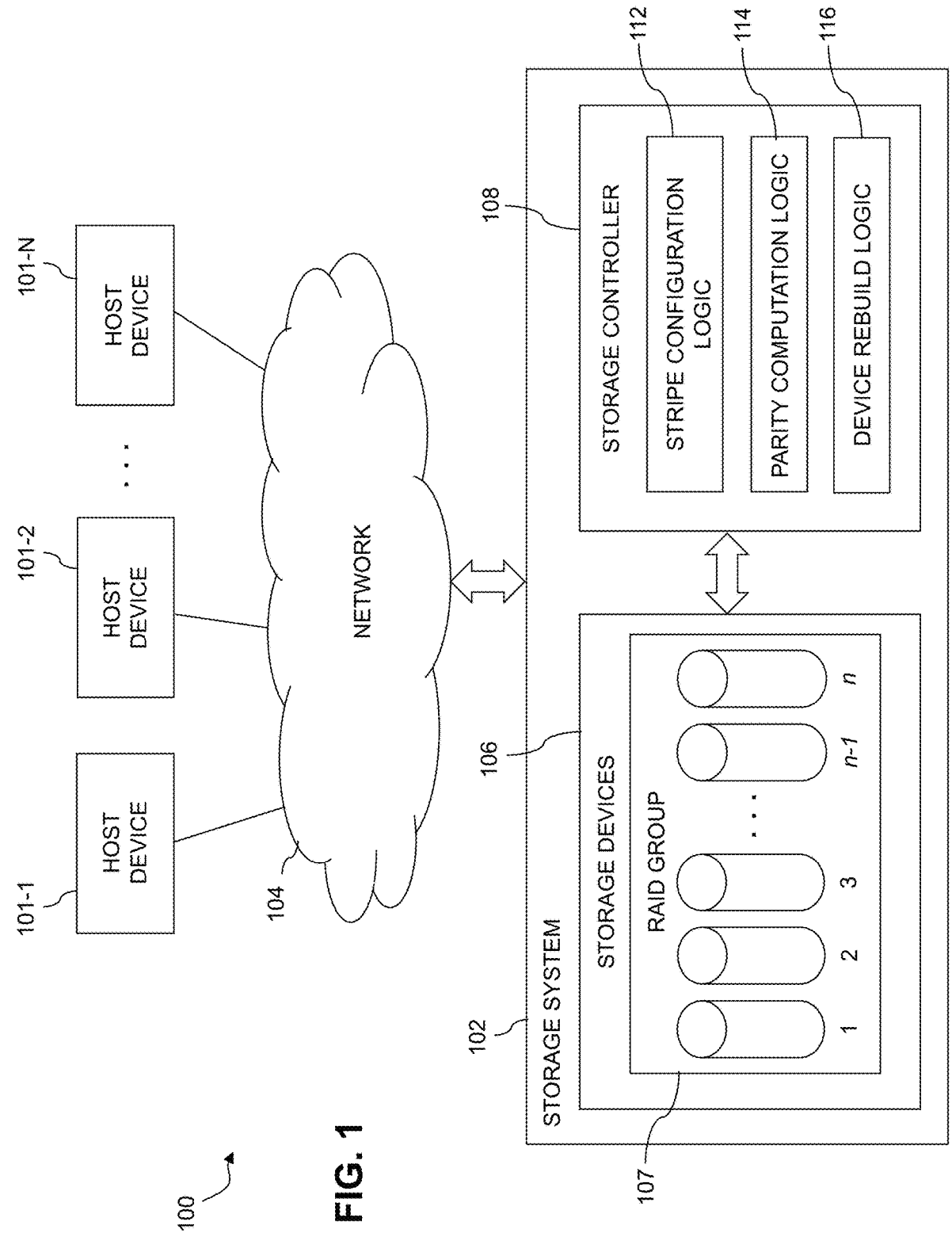
FIG. 1 is a block diagram of an information processing system comprising a storage system configured to guarantee sufficient capacity for distributed RAID rebuild in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with one or more users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of one or more logical storage volumes of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 configured to store data of a plurality of storage volumes. The storage volumes illustratively comprise respective logical units (LUNs) or other types of logical storage volumes. The term "storage volume" as used herein is intended to be broadly construed, and should not be viewed as being limited to any particular format or configuration.

References to "disks" in this embodiment and others disclosed herein are intended to be broadly construed, and are not limited to hard disk drives (HDDs) or other rotational media. For example, at least portions of the storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, HDDs can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX©, VMAX©, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath© driver from Dell EMC. Other types of MPIO drivers from other driver vendors may be used.

The storage system 102 in this embodiment stores data across the storage devices 106 in accordance with at least one RAID arrangement 107 involving multiple ones of the storage devices 106. The RAID arrangement 107 in the present embodiment illustratively comprises at least one RAID group. The RAID group illustratively comprises storage devices that each have the same capacity. Alternatively, the RAID group may comprise mixed-capacity storage devices, such as one or more storage devices having relatively low capacities and one or more storage devices having relatively high capacities. Such a RAID group is also referred to herein as a mixed-capacity RAID group. There may be multiple distinct RAID groups within the storage system 102, each involving a different subset of the storage devices 106. The term "RAID group" as used herein is intended to be broadly construed, so as to encompass, for example, a set of storage devices that are part of a given RAID arrangement, such as at least a subset of the storage devices 106 that are part of the RAID arrangement 107. A given such RAID group comprises a plurality of stripes, each containing multiple stripe portions distributed over multiple ones of the storage devices 106 that are part of the RAID group.

In the particular illustrative RAID arrangement 107 shown in the figure, the example RAID group more specifically comprises a subset of the storage devices 106 that includes n of the storage devices 106 individually denoted 1 through n, respectively, with each such storage device being assumed for simplicity of illustration to have the same storage capacity. For example, the storage devices 1 through n may comprise respective SSDs each having a 500 GigaByte (GB) capacity, a 1 TeraByte (TB) capacity, or another capacity, although these and other particular storage device capacities referred to herein should not be viewed as limiting in any way. It is to be appreciated, however, that the disclosed techniques can be readily extended to other types of RAID groups, such as mixed-capacity RAID groups, each including a variety of different SSDs having different capacities. Illustrative embodiments can therefore include more than two sets of storage devices, such as three, four or more different sets of storage devices, with the storage devices of a given such set each having a storage capacity that is different than that of the storage devices of the other sets. One or more of such sets can alternatively include only a single storage device rather than multiple storage devices.

The RAID arrangement 107 can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. As will be described in more detail below, illustrative embodiments disclosed herein provide efficient mechanisms to guarantee sufficient capacity in these and other situations in which allocation of blocks to stripes cannot be predetermined, and in numerous other demanding RAID arrangements, including those involving parity RAID techniques and/or non-parity RAID techniques.

The RAID arrangement 107 is established by a storage controller 108 of the storage system 102. The storage devices 106 in the context of the RAID arrangement 107 and other RAID arrangements herein are also referred to as "disks" or "drives." A given such RAID arrangement may also be referred to in some embodiments herein as a "RAID array."

The RAID arrangement 107 in this embodiment illustratively includes an array of n different "disks" denoted 1 through n, each a different physical storage device of the storage devices 106. Multiple such physical storage devices are typically utilized to store data of a given LUN or other logical storage volume in the storage system 102. For example, data pages or other data blocks of a given LUN or other logical storage volume can be "striped" along with its corresponding parity information across multiple ones of the disks in the RAID arrangement 107 in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments.

As mentioned previously, conventional RAID techniques of this type can be problematic. For example, in distributed RAID arrangements, in which the total number of blocks per stripe is less than the total number of storage devices across which the blocks are distributed, it is unduly difficult under conventional practice to ensure that there is sufficient available capacity to rebuild the blocks of one or more failed storage devices.

Conventional approaches typically require the performance of complex calculations in order to determine a particular allocation of spare capacity across the multiple storage devices, or instead allocate excessive amounts of spare capacity to each device, which wastes storage device capacity and therefore degrades storage system performance.

The storage system 102 overcomes these and other drawbacks of conventional practice by implementing techniques for guaranteeing sufficient capacity for a distributed RAID rebuild process. For example, as will be described in more detail below, the storage system 102 is configured to guarantee sufficient rebuild capacity, without the need for complex calculations or wasted capacity, for a wide variety of different RAID arrangements. Such embodiments provide RAID arrangements in which spare blocks are reserved for storage devices in a manner that ensures that a rebuild process initiated responsive to a failure of one or more of the storage devices is guaranteed to have sufficient available storage device capacity to complete the rebuilding of the blocks of the one or more failed storage devices. Reserved capacity in some embodiments is shared at the storage device level, such that, for example, spare blocks reserved on one storage device can be used to rebuild blocks of different ones of the other storage devices in the event that one of those other storage devices were to fail.

Advantageously, such techniques in illustrative embodiments herein can guarantee sufficient capacity to complete the rebuild process, while also being computationally simple, as well as highly efficient in that only at or near minimum amounts of capacity need to be reserved for rebuild within the storage system.

The storage controller 108 of storage system 102 comprises stripe configuration logic 112, parity computation logic 114, and device rebuild logic 116. The stripe configuration logic 112 determines an appropriate stripe configuration and a distribution of stripe portions across the storage devices 106 for a given RAID arrangement, including allocation of spare devices for each stripe and reservation of spare blocks for each device in conjunction with guaranteeing sufficient rebuild capacity. The parity computation logic 114 performs parity computations of various RAID arrangements, such as p parity computations of RAID 5, and/or p and q parity computations of RAID 6, using well-known techniques. The device rebuild logic 116 is configured to control the performance of a RAID rebuild process in the storage system 102, as will be described in more detail elsewhere herein.

As noted above, the storage system 102 in this embodiment implements functionality for guaranteeing sufficient capacity for RAID rebuild. This illustratively includes the performance of a process for guaranteeing sufficient capacity for RAID rebuild in the storage system 102, such as the example process to be described below in conjunction with FIG. 2.

References herein to "guaranteeing sufficient capacity for RAID rebuild" are intended to be broadly construed, so as to encompass various types of RAID arrangements in which spare blocks are reserved for particular storage devices 106 in accordance with establishment of the RAID arrangement in the storage system 102.

In operation, the storage controller 108 via its stripe configuration logic 112 establishes a RAID arrangement comprising a plurality of stripes each having multiple portions distributed across multiple ones of the storage devices 106. Examples include the RAID arrangement 107, and the additional RAID arrangements to be described below in conjunction with FIGS. 3 through 6. As mentioned previously, a given RAID 5 or RAID 6 arrangement provides redundancy that supports recovery from failure of a single one of the storage devices 106, or simultaneous failure of two of the storage devices 106, respectively. Other types of RAID arrangements can be used in other embodiments, including other RAID arrangements each supporting at least one recovery option for reconstructing data blocks of at least one of the storage devices 106 responsive to a failure of that storage device.

The stripe portions of each of the stripes illustratively comprise a plurality of data blocks and one or more corresponding parity blocks. The data and parity blocks are also referred to herein as "chunklets" of a RAID stripe, and such blocks or chunklets are examples of what are more generally referred to herein as "stripe portions." In the case of RAID 5, the parity blocks or parity chunklets illustratively comprise row parity or p parity blocks, and are generated by parity computation logic 114 using well-known RAID 5 techniques. In the case of RAID 6, the parity blocks or parity chunklets illustratively comprise row parity or p parity blocks and diagonal parity or q parity blocks, and are generated by parity computation logic 114 using well-known RAID 6 techniques.

The storage controller 108 utilizes its stripe configuration logic 112 to establish a RAID arrangement comprising a plurality of stripes, with each of the plurality of stripes comprising a plurality of data blocks and one or more corresponding parity blocks, the data blocks and parity blocks being distributed across multiple ones of the storage devices 106 of a RAID group. It is to be appreciated, however, that non-parity RAID arrangements, or combinations of non-parity and parity RAID arrangements, can also be used.

Accordingly, in certain portions of the following description of illustrative embodiments, the term "blocks" will be used to refer generally to both data blocks and parity blocks. A RAID arrangement can therefore more generally comprise a plurality of stripes, with each of the plurality of stripes comprising a plurality of blocks, and the blocks being distributed across multiple ones of the storage devices.

In conjunction with establishment of the RAID arrangement, the storage controller 108 is further configured, for each of the plurality of stripes, to designate a particular one of the storage devices as a spare storage device for that stripe, and for each of the storage devices, to determine numbers of the stripes for which that storage device is designated as a spare device for respective ones of the other storage devices. The storage controller 108 reserves a particular number of spare blocks for each of the storage devices based at least in part on the determined numbers of the stripes for which that storage device is designated as a spare device for respective ones of the other storage devices.

The RAID arrangement in some embodiments comprises a distributed RAID arrangement in which a total number of blocks per stripe is less than a total number of the storage devices over which the blocks of the plurality of stripes are distributed. Distributed RAID generally refers to a type of RAID in which the width of the RAID stripe in blocks is smaller than the total number of storage devices over which the blocks are distributed. An important advantage of distributed RAID relative to other types of RAID is a shorter rebuild time. For example, in distributed RAID, spare blocks are illustratively distributed over all of the storage devices that store blocks of the RAID stripes, which reduces rebuild time as the writes performed in conjunction with rebuild are spread over all of those storage devices. Such distributed RAID arrangements can include parity RAID arrangements, non-parity RAID arrangements, or possibly combinations of multiple different RAID types.

In some embodiments, the storage system 102 is further configured to store stripe metadata indicating for each of the stripes the particular one of the storage devices that is designated as a spare storage device for that stripe. For example, the stripe metadata indicating for each of the stripes the particular one of the storage devices that is designated as a spare storage device for that stripe illustratively comprises an allocation table, with the allocation table comprising a plurality of entries for respective ones of the stripes with each such entry comprising an identifier of the storage device that is designated as a spare storage device for that stripe. An example of an allocation table is shown in FIG. 4, although a wide variety of other types of tables or other metadata structures can be used.

Additionally or alternatively, the storage system 102 is further configured to store stripe metadata indicating for each of the storage devices the determined numbers of the stripes for which that storage device is designated as a spare device for respective ones of the other storage devices. For example, the stripe metadata indicating for each of the storage devices the determined numbers of the stripes for which that storage device is designated as a spare device for respective ones of the other storage devices comprises a reserve table, with the reserve table comprising a plurality of entries for respective ones of the storage devices with each such entry comprising the determined numbers of the stripes for which that storage device is designated as a spare device for respective ones of the other storage devices. An example of a reserve table is shown in FIG. 5, although again a wide variety of other types of tables or other metadata structures can be used. For example, a single table or other type of single metadata structure can be configured to store the collective allocation and reserve information of the respective allocation and reserve tables of FIGS. 4 and 5.

In some embodiments, reserving a particular number of spare blocks for each of the storage devices based at least in part on the determined numbers of the stripes for which that storage device is designated as a spare device for respective ones of the other storage devices comprises reserving a particular number of spare blocks that is equivalent to a highest one of the determined numbers of the stripes. In such an arrangement, the number of spare blocks reserved for a given one of the storage devices is the maximum number of the determined numbers of stripes for which that storage device is designated as a spare device for respective ones of the other storage devices. Alternative techniques can be used to reserve particular numbers of spare blocks for respective storage devices based at least in part on their respective sets of determined numbers in other embodiments.

The storage system 102 is illustratively further configured to detect a failure of at least one of the storage devices, and responsive to the detected failure, to initiate a rebuild process to reconstruct blocks of the one or more failed storage devices utilizing the blocks of other ones of the storage devices. The rebuild process utilizes at least a subset of the reserved spare blocks of respective ones of the non-failed storage devices. The reserved spare blocks are sufficient in number to guarantee that a rebuild process initiated responsive to a failure of one or more of the storage devices has sufficient available storage device capacity to reconstruct the blocks of the one or more failed storage devices.

In some embodiments, the reserved spare blocks of a given one of the storage devices are available for utilization in reconstructing one of at least first and second other ones of the storage devices in a rebuild process initiated responsive to a failure of said one of the at least first and second other ones of the storage devices. Each of the storage devices is designated as a spare device for multiple other ones of the storage devices.

In the case of parity RAID arrangements, the storage controller 108 detects a failure of at least one of the storage devices of the RAID arrangement, and responsive to the detected failure, reconstructs data blocks of that storage device utilizing the data blocks and parity blocks stored on other ones of the storage devices, with the reconstructed data blocks being stored in respective ones of the available spare blocks.

This reconstruction also utilizes what is more generally referred to herein as a "rebuild process" to reconstruct the data blocks of the failed storage device based on data blocks and parity blocks of the remaining storage devices of the RAID arrangement. The failure illustratively comprises a full or partial failure of one or more of the storage devices 106 in a RAID group of the RAID arrangement 107. A "remaining storage device" as that term is broadly used herein refers to a storage device that is not currently experiencing a failure. Thus, all of the storage devices of the RAID group other than the one or more storage devices for which a failure was detected are considered remaining storage devices of the RAID group. Such remaining storage devices are also referred to herein as "surviving storage devices," as these storage devices have survived the one or more detected failures.

The storage system 102 illustratively rebuilds stripe portions impacted by the one or more detected failures by reconstruction of impacted data blocks and parity blocks using non-impacted data blocks and parity blocks, using well-known techniques, such as the RAID 5 or RAID 6 techniques mentioned previously. This rebuild process continues until all of the stripe portions of the impacted stripes are fully rebuilt.

Numerous other types of RAID implementations can be used in illustrative embodiments herein, as will be appreciated by those skilled in the art, possibly using error correcting codes such as Reed Solomon codes or other types of codes that are known to those skilled in the art. The term "parity" as used herein is therefore intended to be broadly construed, so as to encompass these and other types of information suitable for use in recovering from at least one failure in at least one storage device.

Additional details regarding examples of techniques for storing data in RAID arrays such as the RAID arrangement 107 of the FIG. 1 embodiment are disclosed in U.S. Pat. No. 9,552,258, entitled "Method and System for Storing Data in RAID Memory Devices," and U.S. Pat. No. 9,891,994, entitled "Updated RAID 6 Implementation," each incorporated by reference herein. For example, these patents provide example techniques for computing parity blocks and performing rebuild processes using such parity blocks, although numerous other known techniques can be used.

In some embodiments, establishing a RAID arrangement in which sufficient rebuild capacity is guaranteed comprises executing an algorithm to determine an appropriate distribution of reserve capacity across multiple storage devices, and to utilize portions of that reserve capacity in a rebuild process triggered by a device failure.

An example of an algorithm that guarantees sufficient capacity for the RAID rebuild in the manner described above, without placing any assumptions on the assignment of blocks to stripes and using only a near minimal amount of reserved storage space, illustratively includes the following steps.

1. For each stripe, when the stripe is allocated determine which storage device will serve as its spare. This does not actually reserve any capacity. An identifier of the spare device is stored as part of stripe metadata for its corresponding stripe.

2. Maintain a table that indicates for each storage device how many times it serves as a spare for each other storage device.

3. For each storage device, the amount of reserve capacity is determined as the maximal amount of reserve capacity it provides for any other storage device.

4. When a storage device fails, each stripe allocates for use in a rebuild process at least one spare block from its spare device as identified in the stripe metadata.

Such an algorithm is illustratively executed by the stripe configuration logic 112, the parity computation logic 114 and the device rebuild logic 116 of the storage controller 108 in storage system 102.

These and other algorithms disclosed herein can provide guaranteed sufficient reserve capacity for rebuild, without regard to the particular RAID type being used (e.g., different RAID stripes may have been allocated for different RAID types) or whether multiple instances of one or more RAID types are used. Reserved capacity is shared at the device level, such that, for example, the reserved capacity of a first device can be used by a second device if that device fails, by a third device if that device fails, and so on. The disclosed algorithms are also computationally very simple, illustratively involving designation of spare devices for respective allocated stripes and reserving of spare blocks based on numbers of times each device serves as a spare for respective other devices, followed by selection of spare blocks from spare devices as part of a rebuild process when a device fails.

It is to be appreciated that this particular algorithm, like others described herein, is presented by way of illustrative example only, and can be varied in other embodiments. For example, certain steps can be performed at least in part in parallel with other steps in other embodiments. Also, additional or alternative steps can be used in other embodiments, as well as different RAID arrangements.

As indicated previously, the above-described techniques relating to guaranteeing sufficient capacity for RAID rebuild in the storage system 102 are illustratively implemented at least in part by the storage controller 108, utilizing its stripe configuration logic 112 and parity computation logic 114. A rebuild process utilizing data blocks and parity blocks to recover from one or more storage device failures is illustratively implemented at least in part by the storage controller 108, utilizing its device rebuild logic 116.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

A RAID group in some embodiments is established for a particular one of the storage nodes of a distributed implementation of storage system 102. The storage devices associated with the particular one of the storage nodes are illustratively part of a DAE of that storage node, although other storage device arrangements are possible. Each such storage device illustratively comprises an SSD, HDD or other type of storage drive. Similar arrangements can be implemented for each of one or more other ones of the storage nodes, although distributed implementations using multiple storage nodes are not required.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 15 and 16.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, RAID arrangement 107, storage controller 108, stripe configuration logic 112, parity computation logic 114, and device rebuild logic 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, which implements a process for guaranteeing sufficient capacity for RAID rebuild in the storage system 102. The process illustratively comprises an algorithm implemented at least in part by the storage controller 108 and one or more of its logic instances 112, 114 and 116. As noted above, the storage devices 106 in some embodiments are more particularly referred to as "drives" and may comprise, for example, SSDs, HDDs, hybrid drives or other types of drives. A plurality of storage devices, which may be of the same capacity or of various mixed capacities, over which a given RAID arrangement is implemented illustratively comprises what is generally referred to herein as a RAID group.

The process as illustrated in FIG. 2 includes steps 200 through 206, and is described in the context of storage system 102 but is more generally applicable to a wide variety of other types of storage systems each comprising multiple storage devices. The process is illustratively performed under the control of the storage controller 108, utilizing stripe configuration logic 112 and parity computation logic 114. Thus, the FIG. 2 process can be viewed as an example of an algorithm collectively performed by the logic instances 112 and 114. Other examples of such algorithms implemented by a storage controller or other storage system components will be described elsewhere herein.

In step 200, the storage system 102 allocates stripes for a distributed RAID arrangement comprising at least one RAID group such as that illustrated in the RAID arrangement 107 involving storage devices 106 of FIG. 1. The RAID arrangement 107 encompasses a particular number n of the storage devices 106. More detailed examples of distributed RAID arrangements involving n=5 storage devices, denoted D1, D2, D3, D4 and D5, are described below in conjunction with the illustrative embodiments of FIGS. 3 through 6.

In step 202, the storage system 102 designates, for each of the stripes of the RAID arrangement, a particular one of the storage devices as a spare device. Different ones of the storage devices are illustratively designated as spare devices for respective different ones of the stripes, and each of the storage devices is illustratively designated as a spare device for multiple distinct ones of the stripes.

In step 204, the storage system 102 determines, for each of the storage devices of the RAID arrangement, numbers of stripes for which that storage device is designated as a spare device for respective other ones of the storage devices.

In step 206, the storage system 102 reserves a number of spare blocks for each of the storage devices that is equivalent to the highest number of its determined number of stripes. The reserved numbers of spare blocks for the storage devices are such that sufficient rebuild capacity is guaranteed.

Stripe arrangements of the type utilized in the FIG. 2 process are illustratively configured using stripe configuration logic 112 of storage controller 108. In embodiments involving parity RAID arrangements, one or more parity blocks are computed for each RAID stripe using data blocks of that RAID stripe. Parity blocks are illustratively computed using parity computation logic 114 of storage controller 108.

The steps are shown in sequential order for clarity and simplicity of illustration only, and certain steps can at least partially overlap with other steps. For example, the determination of numbers of stripes for which each device is designated as a spare for respective other devices in step 204 and the reserving of numbers of spare blocks for respective devices in step 206 can be performed at least in part in parallel. For instance, steps 204 and 206 can be separately iterated for each device.

Different instances of the process of FIG. 2 can be performed for different portions of the storage system 102, such as different storage nodes of a distributed implementation of the storage system 102.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for guaranteeing sufficient capacity for RAID rebuild in a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for guaranteeing sufficient capacity for RAID rebuild for respective different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 in storage system 102 that is configured to perform the steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms.

Additional illustrative embodiments will now be described with reference to FIGS. 3 through 6. These embodiments utilize a distributed RAID arrangement involving n=5 storage devices, denoted D1, D2, D3, D4 and D5.

Referring initially to FIG. 3A, the RAID arrangement as shown includes 13 stripes of blocks which are distributed over the five storage devices in the manner illustrated. The RAID arrangement is more particularly assumed to comprise a RAID 5 arrangement in which each stripe includes two data blocks and one parity block. Thus, the total number of blocks per stripe is less than the number of storage devices over which the blocks are distributed, and the RAID arrangement is therefore a type of distributed RAID arrangement. Each stripe includes exactly three blocks on three different devices, as indicated with the "1" entries within the table illustrated in the figure.

The distribution of blocks over the storage devices in the example of FIG. 3A is generally random in appearance, and the total utilization of each device in number of blocks is substantially equal, with 8 blocks on each of D1, D2, D3 and D4 and 7 blocks on D5, as can be seen in the summation row labeled Σ.

Since the maximal number of utilized blocks per device is 8, when a device fails up to 8 blocks must be rebuilt to other devices. After the failure of a device there are 4 remaining devices, and therefore it may appear that it is sufficient to simply reserve two spare blocks on each device using a static algorithm. However, since each stripe may have its own restrictions of which devices can be considered for its spare (e.g., the spare may not be a device that is already in use by the stripe), solving this problem for the more general case is extremely difficult computationally. A simple static algorithm that uses any eligible device for a spare may not be able to fulfill the needs of all the stripes, leading to potential insufficient capacity to complete the rebuild. Such a scenario is illustrated in FIG. 3B.

In the FIG. 3B example, it is assumed that device D2 has failed, and that "x" entries in the table shown indicate the spare blocks that are selected for rebuilding the D2 blocks of respective ones of the stripes. Running from the top downward, the static algorithm gets stuck on stripe 11 where the two candidate devices for spare allocation to rebuild that stripe are D1 and D3. The problem is that both of the devices D1 and D3 have each already exhausted their respective reserved capacities of two blocks. The rebuild process in this example therefore fails to complete due to insufficient spare capacity.

Such insufficient capacity issues are addressed in illustrative embodiments using the techniques disclosed herein.

FIG. 4 shows an example allocation table in which a spare device is allocated to each of a plurality of RAID stripes in an illustrative embodiment. The RAID arrangement in this example is the same as that of FIGS. 3A and 3B, with the "1" entries indicating the blocks of each of the 13 stripes. The FIG. 4 example more particularly illustrates an allocation table in which, for each of the stripes, a particular one of the storage devices D1 through D5 is designated as a spare device for that stripe, by entry of its corresponding device identifier in the "spare" column of the allocation table.

Accordingly, each stripe is assigned a particular one of the devices as its spare device. For each stripe, as three of the devices are already used for blocks, there are only two candidate spare devices. The logic of stripe allocation is not restricted in this regard, and so in some embodiments the same or similar mechanism used to allocate blocks of the stripes to the storage devices can be used to allocate spare storage devices for the respective stripes. In some embodiments, in order to minimize the rebuild time, the spare allocation logic should attempt to maintain an even distribution of spare capacity, and an even number of device dependencies, although numerous other arrangements can be used in allocating the spare devices.

FIG. 5 shows an example reserve table in which numbers of spare blocks are reserved for respective ones of the storage devices D1 through D5, using the techniques disclosed herein, such that sufficient capacity is guaranteed for distributed RAID rebuild. The "blocks" column denotes for each of the storage devices in the "device" column the total number of stripes for which that device is designated as a spare device for respective other ones of the devices. A device cannot serve as a spare device for itself, and so there are zeros on the diagonal in the "source" portion of the table.

Considering device D1, that device is designated as a spare for a stripe block of device D2 twice, for D3 once, for D4 twice, and for D5 once, as is apparent from the allocation table of FIG. 4. The maximum of these determined numbers of stripes for device D1 is 2, as shown in the "blocks" column of the reserve table of FIG. 5.

Similarly, for device D2, that device is designated as a spare for a stripe block of device D1 three times, for D3 twice, for D4 once, and for D5 three times, as is again apparent from the allocation table of FIG. 4. The maximum of these determined numbers of stripes for device D2 is 3, as shown in the "blocks" column of the reserve table of FIG. 5.

As another example, for device D3, that device is designated as a spare for stripe blocks of device D1 twice, for D2 three times, for D4 twice, and for D5 twice, as is once again apparent from the allocation table of FIG. 4. The maximum of these determined numbers of stripes for device D3 is 3, as shown in the "blocks" column of the reserve table of FIG. 5.

The maximum number of blocks is similarly determined for devices D4 and D5, from the allocation table of FIG. 4.

Spare blocks are reserved for the different devices using the numbers in the "blocks" column of the reserve table. In other words, total numbers of spare blocks given by 2, 3, 3, 2 and 3 are reserved on the respective storage devices D1, D2, D3, D4 and D5. Although it may appear that the required spare blocks in this example (3 in some cases) are much higher (50% more) than what is theoretically required (only 2), that is primarily due to fact that the present example uses a very low number of stripes for clarity and simplicity of illustration. It is expected that numerous practical implementations will typically contain a much larger number of stripes, and therefore a much lower percentage increase in required spare capacity relative to the theoretical minimum associated with use of a static approach, while also serving to guarantee sufficient capacity to complete the rebuild process.

As noted above, use of a simple static algorithm led to insufficient capacity to complete the rebuild in FIG. 3B.

FIG. 6 illustrates that the reserved spare blocks following the "blocks" column of the FIG. 5 reserve table are guaranteed to provide sufficient capacity to complete the rebuild process after the failure of D2. More specifically, all eight blocks of the distributed RAID arrangement that were stored on failed device D2 are rebuilt using the selected spare blocks denoted by "x" entries in the table of FIG. 6, and unlike the FIG. 3B situation described previously, none of the surviving devices in FIG. 6 run out of spare capacity before the rebuilding of all impacted stripes is completed. More particularly, in the FIG. 6 example, D3 provides three spare blocks in the rebuild process, but three spare blocks were reserved for D3 in the FIG. 5 reserve table, and so the rebuild can complete successfully.

Although these examples use stripes and blocks as allocation units, this is by way of illustrative example only, and different allocation units can be used in other embodiments. For example, an allocation unit can be larger than a single RAID stripe, depending on various aspects of the RAID design. Illustrative embodiments can be adapted in a straightforward manner for use with these and other such larger allocation units.

Also, the examples above are given for RAID 5 but illustrative embodiments are not restricted to RAID 5, RAID 6 or other types of parity RAID. Any RAID arrangement or combination of RAID arrangements may be used.

Accordingly, it is to be appreciated that the particular RAID arrangements illustrated in FIGS. 3 through 6 are examples only, and should not be viewed as limiting in any way. A wide variety of other RAID arrangements may be configured to guarantee sufficient capacity for RAID rebuild using the techniques disclosed herein.

Additional illustrative embodiments will now be described with reference to FIGS. 7 through 14. These embodiments are more particularly configured to guarantee sufficient reserve capacity for multiple failures in a distributed storage system. As will be described, two spare devices are allocated to each stripe in these embodiments, rather than the single spare device allocated to each stripe in the embodiments of FIGS. 3 through 6.

The embodiments previously described with reference to FIGS. 3 through 6 allow sharing of spare capacity while guaranteeing that there will be sufficient spare capacity in the event of a failure, regardless of which device fails. Such embodiments are configured to designate a particular device as a spare device for each stripe and to reserve an amount of capacity on each device. The amount of spare capacity reserved on each device is illustratively the maximum amount of capacity that a failure of any other device will require from that particular device in a rebuild process.

The embodiments to be described in conjunction with FIGS. 7 through 14 are more particularly configured to guarantee sufficient spare capacity in the presence of multiple failures, illustratively multiple device failures or a combination of device and node failures, where a node contains two or more devices. Such embodiments are based on designation of multiple spare devices per stripe. When there are multiple spare devices per stripe, spare capacity allocation for a given device not only takes into account the cases in which that device is the first spare used after a single failure, it also takes into account the cases in which it is a second spare and a dual failure occurs.

In the context of multiple failures, the use of multiple spare devices per stripe is relevant also for RAID arrangements that support recovery from only a single failure. For example, in a RAID arrangement that supports recovery from only a single failure (e.g., RAID 5), a second failure can illustratively occur after completion of a rebuild process for a first failure. However, in a RAID arrangement that supports recovery from multiple failures (e.g., RAID 6) the first and second failures may be concurrent.

Illustrative embodiments to be described below provide support for multiple failures while still achieving a near minimal amount of reserved capacity. In these embodiments, each stripe is allocated multiple spare devices.

As will become more apparent, such an arrangement provides a number of significant advantages. For example, this arrangement can provide support for multiple device failures, as well as node failures where each node contains multiple devices, while still guaranteeing sufficient spare capacity to complete rebuild. Also, capacity can be reserved only for stripes that suffer multiple failures. Illustrative embodiments can therefore provide adjustable spare capacity based on required resiliency level (e.g., a single device failure, multiple device failures, a single device failure and a single node failure, and multiple node failures). As in other embodiments herein, the use of shared spare capacity reduces the amount of storage space required to guarantee sufficient spare capacity to complete rebuild.

Figure 7:
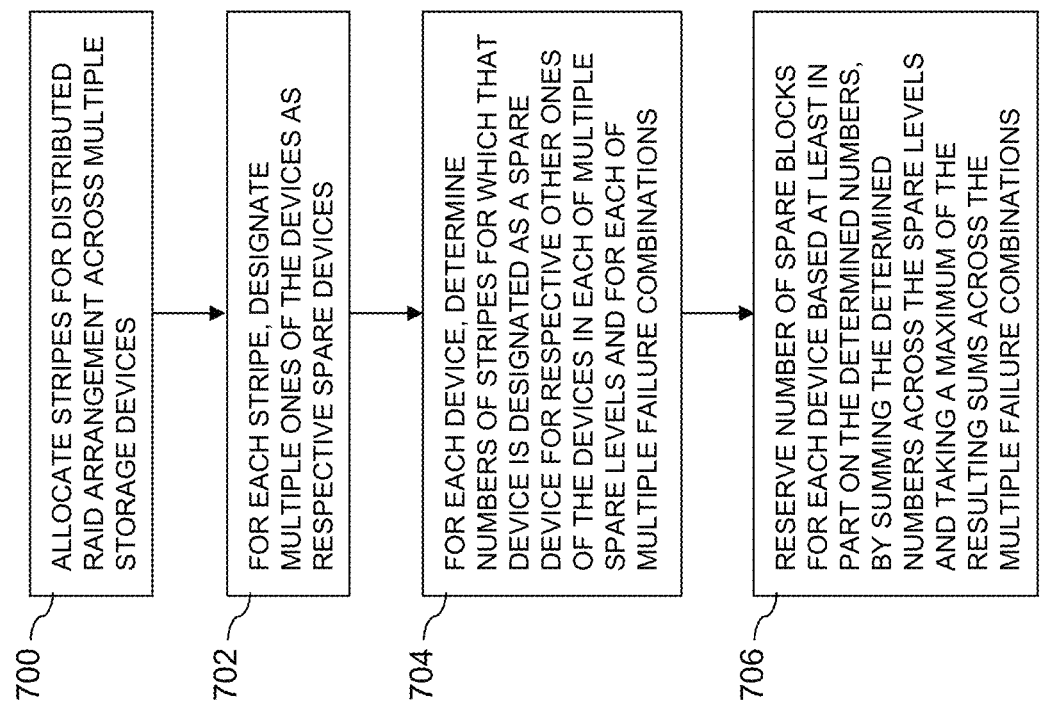
FIG. 7 is a flow diagram of a process for guaranteeing sufficient capacity for distributed RAID rebuild in an illustrative embodiment.

Referring now to the flow diagram of FIG. 7, an example process is shown for guaranteeing sufficient capacity for distributed RAID rebuild in an illustrative embodiment in which multiple spare devices are designated for each storage device of a RAID arrangement, so as to support recovery from multiple failures of the type described above. The process includes steps 700 through 706, and is assumed to be implemented utilizing one or more of the logic instances 112, 114 and 116 of storage controller 108 in storage system 102, in a manner similar to that previously described for the process of FIG. 2.

In step 700, stripes are allocated for a distributed RAID arrangement across multiple storage devices. It is therefore assumed in the present embodiment that the RAID arrangement comprises a distributed RAID arrangement in which a total number of blocks per stripe is less than a total number of the storage devices over which the blocks of the plurality of stripes are distributed.

In step 702, for each stripe, multiple ones of the storage devices are designated as respective spare devices. For example, first and second spare devices may be designated for each of the storage devices of the RAID arrangement. More than two spare devices may be designated in other embodiments.

In step 704, for each device, the process determines numbers of stripes for which that device is designated as a spare device for respective other ones of the devices in each of multiple spare levels and for each of multiple failure combinations. Such determinations illustratively involve the use of multiple counters to maintain respective counts of the numbers of stripes for each device for which that device is designated as a spare device relative to other ones of the devices, although a wide variety of other arrangements are possible. For example, particular determined numbers shown in one or more example tables presented herein can be maintained using respective counters.

In step 706, a number of spare blocks is reserved for each device based at least in part on the determined numbers, for example, by summing the determined numbers across the spare levels and taking a maximum of the resulting sums across the multiple failure combinations.

As in the flow diagram of FIG. 2, the particular steps of the flow diagram of FIG. 7 are presented by way of illustrative example only, and additional or alternative steps, possibly performed in a different order or an at least partially overlapping order, can be used in other embodiments.

In the FIG. 7 embodiment, the storage system 102 is illustratively configured to store stripe metadata indicating for each of the stripes the multiple ones of the storage devices that are designated as respective spare devices for that stripe.

For example, the stripe metadata indicating for each of the stripes the multiple ones of the storage devices that are designated as respective spare devices for that stripe illustratively comprises an allocation table. The allocation table illustratively comprises a plurality of entries for respective ones of the stripes with each such entry comprising identifiers of the storage devices that are designated as respective spare devices for that stripe.

Additionally or alternatively, the storage system 102 may be further configured to store stripe metadata indicating for each of the storage devices the determined numbers of the stripes for which that storage device is designated as a spare device for respective ones of the other storage devices in each of multiple spare levels and for each of multiple failure combinations.

For example, the stripe metadata indicating for each of the storage devices the determined numbers of the stripes for which that storage device is designated as a spare device for respective ones of the other storage devices in each of multiple spare levels and for each of multiple failure combinations comprises a reserve table. The reserve table illustratively comprises a plurality of entries for respective ones of the storage devices with each such entry comprising the determined numbers of the stripes for which that storage device is designated as a spare device for respective ones of the other storage devices in each of multiple spare levels and for each of multiple failure combinations. As indicated above, counters can be used in some embodiments to provide respective ones of the determined numbers.

Reserving a particular number of spare blocks for each of the storage devices based at least in part on the determined numbers of the stripes for which that storage device is designated as a spare device for respective ones of the other storage devices across the multiple spare levels and the multiple failure combinations illustratively comprises summing the determined numbers for the storage device across the spare levels to generate resulting sums for respective ones of the failure conditions, determining a highest one of the resulting sums across the respective ones of the failure conditions, and reserving a particular number of spare blocks for the storage device that is greater than or equal to the highest one of the resulting sums.

In some embodiments, designating multiple ones of the storage devices as respective spare devices for a given one of the stripes comprises designating at least first and second storage devices as respective first and second spare devices for the given stripe. The first and second storage devices correspond to respective first and second spare levels of the multiple spare levels. A first failure impacting the given stripe results in utilization of a spare block of the first spare device and a second failure impacting the given stripe results in utilization of a spare block of the second spare device.

The failure combinations in some embodiments comprise respective different sets of two or more of the storage devices. Numerous other types of failure combinations can be used in other embodiments.

For example, in some embodiments, different ones of the storage devices are implemented on different ones of a plurality of nodes of a distributed storage system. In such an embodiment, the failure combinations may comprise different combinations of one of the storage devices and one of the nodes.

An example algorithm in an illustrative embodiment with multiple spare devices per storage device will now be described in further detail with reference to FIGS. 8 through 14. The algorithm in this embodiment generally operates in two steps, also denoted below as Step 1 and Step 2, as follows:

Step 1. Allocate spare devices to each stripe in conjunction with allocation of the stripe, and reserve sufficient spare capacity on those spare devices. This step illustratively utilizes an allocation table and a reserve table, examples of which are shown in respective FIGS. 8 and 9, although other types of stripe metadata can be used in other embodiments.

In the allocation table, for each stripe, when the stripe is allocated, N devices are allocated to serve as its spare devices, where N is the maximal number of supported failures. As in other embodiments, this does not actually reserve any capacity. The spare device IDs are stored as part of the stripe metadata. It should be noted that the variable N in this context is used in a different manner than in one or more other contexts herein.

In the reserve table, for each spare device, information is stored regarding the combinations of source devices that when failed lead to allocation of spare capacity from the spare device. This illustratively involves performing the following operations (a) through (c):

(a) For each spare device, calculate how much spare capacity it requires at each of at least two spare levels, for each of the failure combinations, including how much capacity as a first spare, how much capacity as a second spare, and so on. Each spare device has its spare capacity tracked and accumulated separately at each spare level. For stripes in which the current device is the first spare device, a single failure is tracked for that device. For stripes in which the current device is the second spare device, combinations of two failures that lead to the current device being used as a spare device are tracked for that device. This is continued for all the spare levels.

(b) For each spare device, the spare capacity required by a particular failure combination is the summation of the spare capacities for that spare device over all of the spare levels.

(c) The spare capacity required for each spare device is the maximal value over all of the possible failure combinations. This is the amount of spare capacity that is reserved for that spare device.

Figure 10:
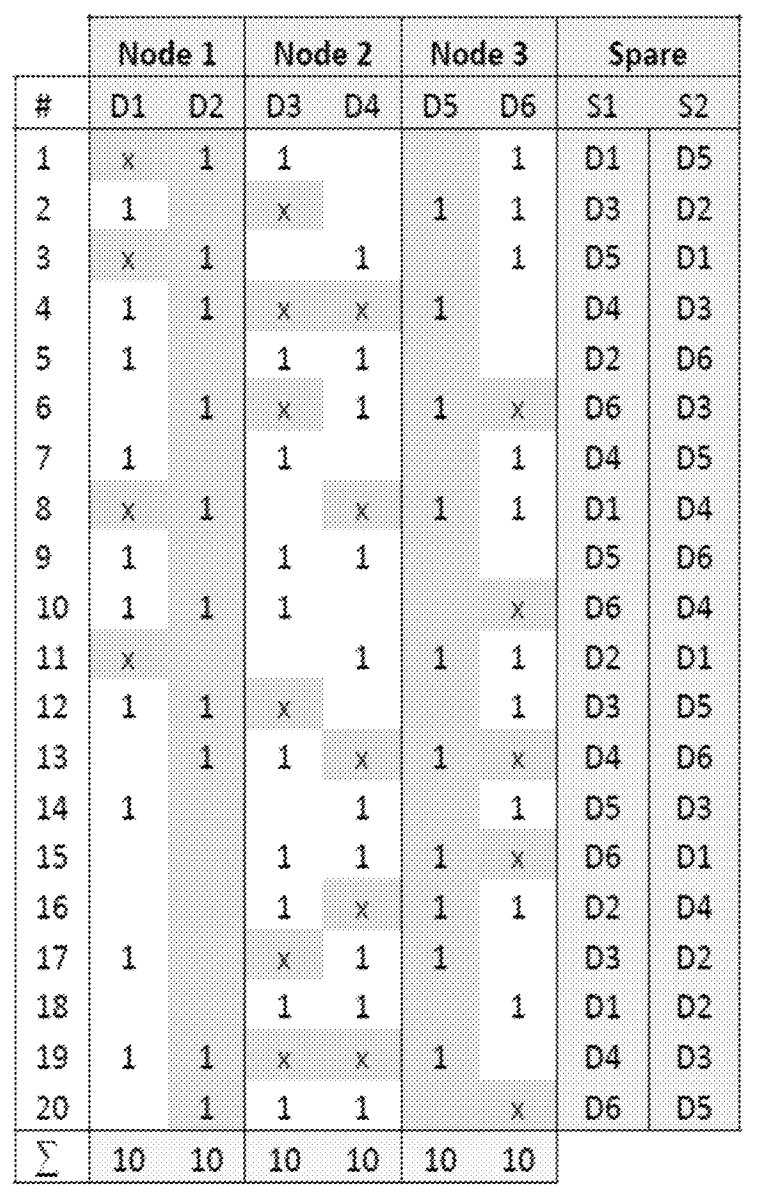

Step 2. Allocate spare blocks from the spare devices when one or more devices fail, for use in rebuild of the corresponding stripes. When a device fails, each impacted stripe allocates a block from a spare device as indicated in its stripe metadata, in accordance with the established ordering of multiple spare devices. The first failure will use the first spare device, the second failure will use the second spare device, and so on. This step is illustrated by a spare block allocation table, an example of which is shown in FIG. 10.

Each of Step 1 and Step 2 will be described in further detail below, using the tables of FIGS. 8, 9 and 10 as examples. Again, other types of tables or data structures can be used in other embodiments.

The allocation of spare devices in Step 1 will first be described in more detail with reference to FIGS. 8 and 9. The allocation table of FIG. 8 shows allocation of two spare devices to each stripe, as compared to the allocation of a single spare device to each stripe in the allocation table of FIG. 4.

The logic of stripe allocation is not restricted and may use the same allocation mechanism as that used by the data blocks. In order to minimize the rebuild time, the spare allocation logic is illustratively configured to provide, to the greatest extent possible within a given implementation, an even distribution of spare capacity, an even number of device dependencies within stripes, and an even distribution of devices as spares to the same stripe.

Step 1 in the present embodiment more particularly proceeds in the following manner. When allocating spare devices for a stripe, for all failure combinations that affect this stripe, increment the number of spare blocks a first spare device requires for this failure combination. For the first spare device, a row is counted only once, even if two data blocks are lost in the failure combination. For a second spare device, the spare is counted if either two data blocks are lost or if one data block is lost and S1 is failed as well.

Figure 8:
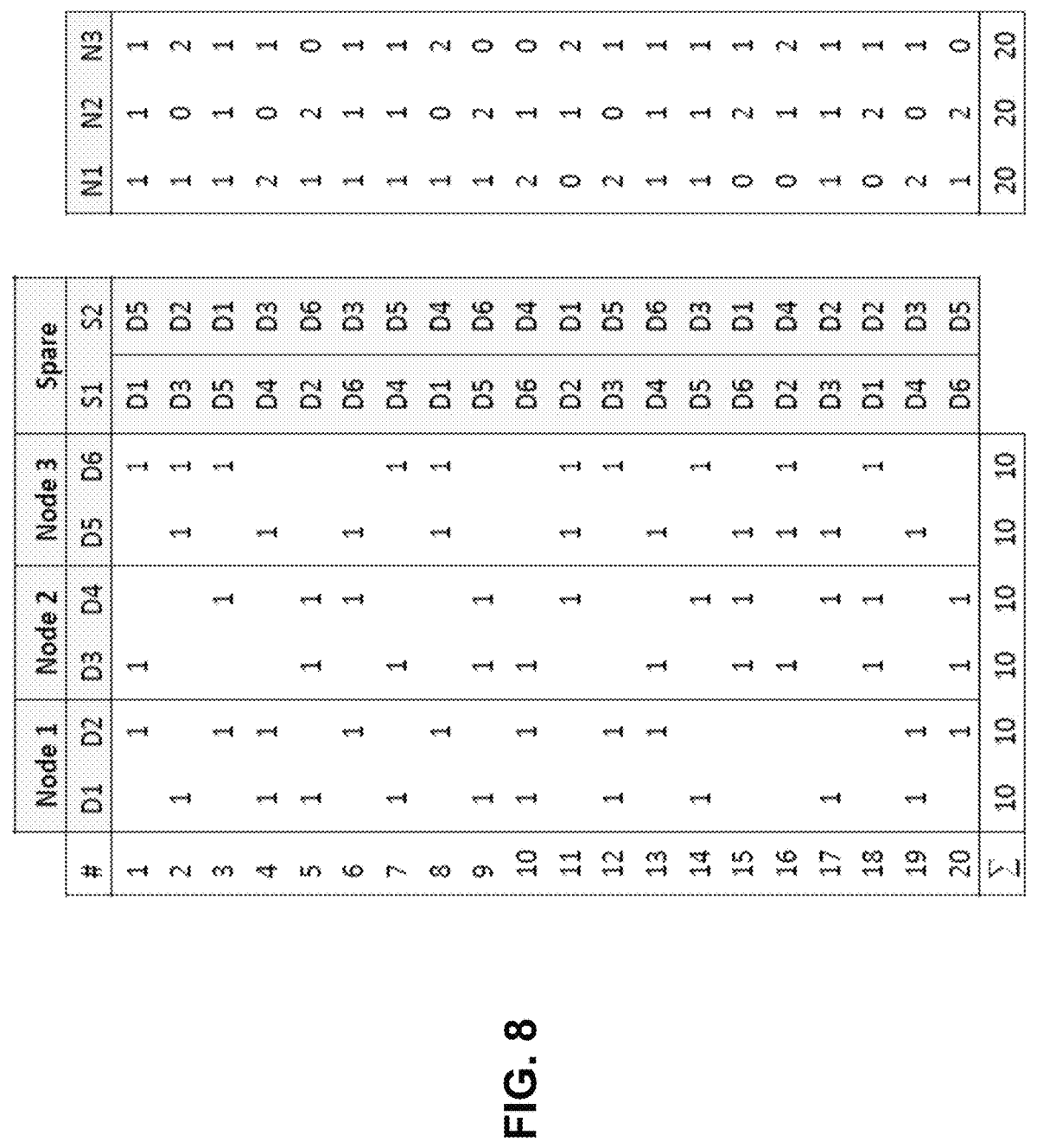

Referring now to the allocation table of FIG. 8, this example uses two spare devices also denoted S1 and S2 and a stripe width of three. This could be, for example, a RAID 5 2+1 arrangement. There are six devices, denoted D1, D2, D3, D4, D5 and D6. The devices are placed within nodes of a distributed storage system, with two devices per node. There are three nodes, denoted Node 1 ("N1"), Node 2 ("N2") and Node 3 ("N3"), with node N1 comprising devices D1 and D2, node N2 comprising devices D3 and D4, and node N3 comprising devices D5 and D6. Each row in the allocation table represents a stripe. The bottom row sums up the number of data blocks placed in each device. The right side of the figure provides the same information but at node granularity rather than at device granularity.

Figure 9:
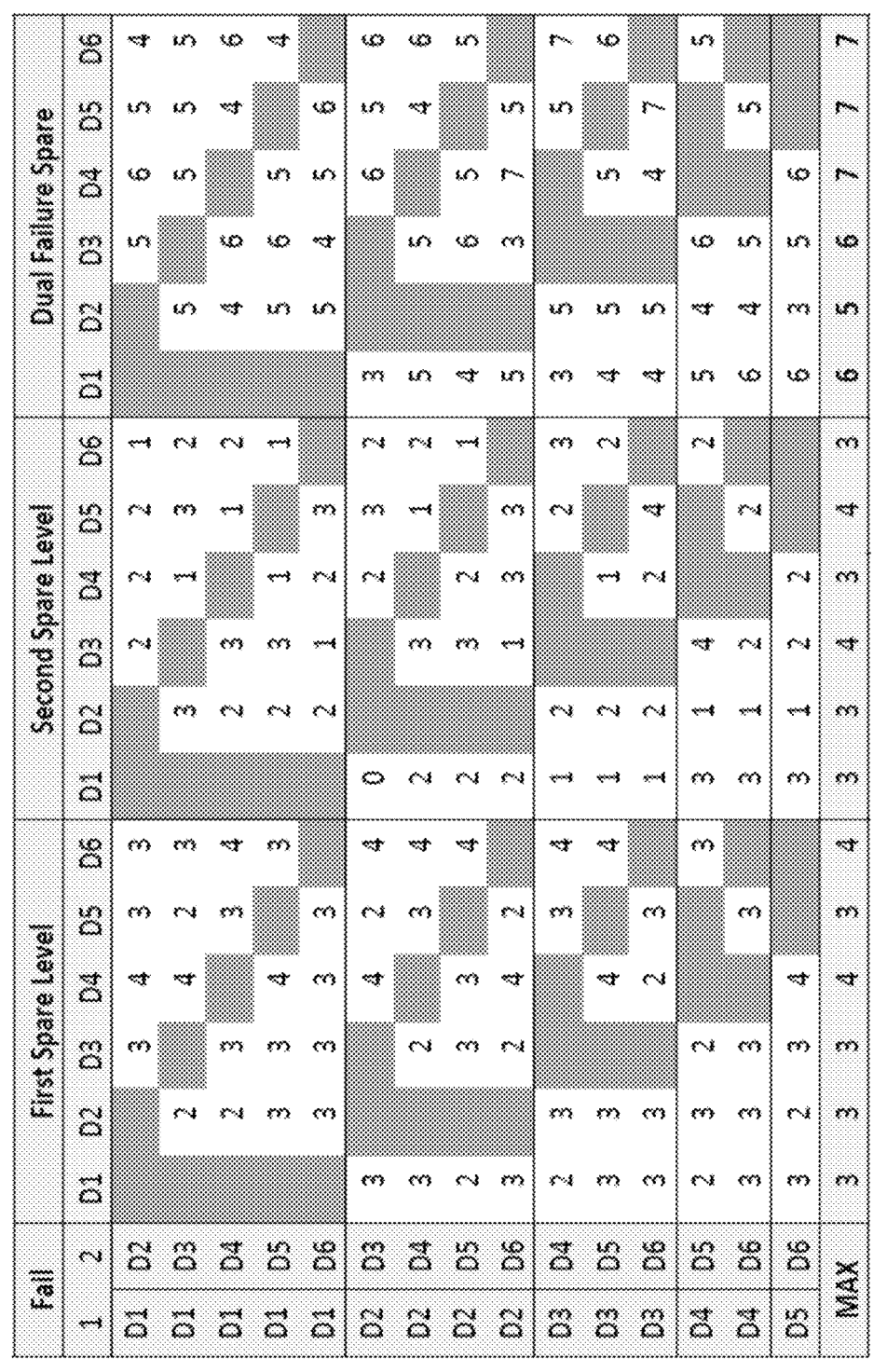

The output of the above-described Step 1 in some embodiments is in the form of a reserve table, illustratively arranged as shown in FIG. 9. Unlike the reserve table of FIG. 5, which uses only a single spare device and therefore a single spare level, the reserve table of FIG. 9 uses two spare devices and therefore has two spare levels, referred to as "First Spare Level" and "Second Spare Level."

The content of the reserve table of FIG. 9 is derived from the 20 stripes of the allocation table of FIG. 8. Each row in the reserve table denotes a different combination of two device failures. The columns denote the spare devices, divided into first spare level and second spare level. The blacked-out cells indicate situations in which the spare device is one of the failed devices in the corresponding failure combination and therefore may not be used as a spare device for that failure combination.

Considering by way of example the case where devices D1 and D2 have failed, the required spare capacity for another device, illustratively device D4, is determined as follows. As a first level spare, D4 must contain four spare blocks corresponding to rows (4, 7, 13, 19) in the allocation table of FIG. 8. Note that row 4 and 19 only count once each towards the total even though both D1 and D2 lost data. As a second level spare, D4 must contain two spare blocks corresponding to rows (8, 10) in the allocation table of FIG. 8. Note that in line 8, only one of the failed devices D1 and D2 contained data but the first spare is D1 which failed and therefore D4 is used.

When allocating a new stripe, for example, the stripe corresponding to row 20 in the allocation table of FIG. 8, the combinations are calculated and added to the tracked metadata. In the case of row 20, there are the following combinations of failures:

1. Single—Add to S1 (which is D6):
   (a) D2, D3, D4
2. Dual—Add to S2 (which is D5):
   (a) 2 Data: {D2, D3}, {D3, D4}, {D2, D4}
   (b) 1 Data and S1: {D2, D6}, {D3, D6}, {D4, D6}

The total number of spares required per failure combination is given in the reserve table of FIG. 9 in the column group titled "Dual Failure Spare." Given the spare capacity required for all spare levels, the required spare capacity per device is calculated. The values are the summation of all the individual spare levels:

Dual Failure Spare=First Spare Level+Second Spare Level

The amount of spare capacity to reserve per device is the maximum of each column in the "Dual Failure Spare" column group. Accordingly, for devices D1, D2, D3, D4, D5 and D6, the corresponding numbers of spare blocks reserved are 6, 5, 6, 7, 7 and 7, respectively, as shown in the MAX line of the "Dual Failure Spare" column group.

Note that if it is desirable to reserve capacity only for those stripes that suffer a dual failure, the maximum of the "Second Spare Level" column group will be the end result of the spare capacity reservation process.

Step 2 of the example algorithm will now be described in more detail.

The allocation of spare blocks in Step 2 responsive to a failure more particularly proceeds in the following manner.

A spare block must be allocated when a device fails. The spare device is determined using stripe metadata, shown in the "Spare" column of the allocation table of FIG. 8. As indicated above, allocation logic is illustratively configured so as to take a spare block from the device in the "Spare" column. The first failure will use a spare block from the first spare device S1 and the second failure will use a block from the second spare device S2.

FIG. 10 shows a spare block allocation table, illustrating allocation of spare blocks after a failure of two devices. In this example, it is assumed that devices D2 and D5 have failed, and "x" entries in the spare block allocation table denote the spare devices used, based on the "Spare" column.

Referring to row 1, only one device failed in this stripe, therefore only the first spare device S1 is used, which is device D1. In row 4, two spare devices are required and hence both spare devices S1 and S2, which are D4 and D3, are used. If the first spare device is failed, the second spare device is used even though only one spare device is needed. This can be seen in row 3 where D5 is the first spare device S1 but that device is failed and so D1 is used.

The algorithm described above provides efficiency advantages over other algorithms. For example, in a static algorithm that allocates dedicated spare stripes, the number of spare blocks required is given by:

SPARE_STRIPES=SPARE_BLOCKS_PER_STRIPE* STRIPES

In the above example of FIGS. 8, 9 and 10, this is 2*20=40.

The number of spare blocks required in the algorithm described above is given by:

SPARE_STRIPES=SPARE_BLOCKS_PER_STRIPE* STRIPES*RAID_WIDTH/ DEVICES*DISTRIBUTION_EVENNESS_FACTOR

The first two parameters are the same as in the previous calculation. Next the number is multiplied by the RAID width as a counter may be incremented for each device used by the stripe. Such counters are illustratively distributed and shared over all the devices, and so the formula divides by the number of devices. DISTRIBUTION_EVENNESS_FACTOR addresses the ability of the algorithm to spread out the spare capacity evenly. For an ideal implementation of the algorithm this factor will be 1. It is clear that this algorithm benefits more when the RAID width is relatively small as compared to the number of devices.

FIG. 11 shows a table illustrating the end result versus the number of reserved blocks in the case of failure of D2 and D5. Since D2 and D5 have failed, they are obviously not used as spare devices and therefore their capacity values are 0 in the "Used" row of the table. The reserved capacity for all the other devices in the "Reserved" row of the table is 6+6+7+7=26. Utilization in this particular example is therefore 20 out of 26 which is 77% utilization of the reserved spare capacity.

Another advantageous feature of this embodiment is that the remaining capacity is not wasted. It can still be used for another failure, although there will no longer be a guarantee of sufficient capacity. The total number of reserved blocks is 38. This is better than the 40 blocks required by the static algorithm, but the improvement is limited because the relatively small number of stripes in this example make it difficult to achieve an even distribution of spare capacity. However, even with only 20 stripes in this simplified example, a small gain is nonetheless achieved relative to a static algorithm. It is expected that larger gains will be achieved in RAID arrangements involving larger numbers of stripes.

The manner in which illustrative embodiments support node failures will now be described in further detail with reference to FIGS. 12, 13 and 14.

In addition to supporting multiple device failures, the algorithm described above also supports RAID arrangements that are spread across nodes of a distributed storage system, such as RAID arrangements in which each block is on a different node. Such scenarios are common when the devices are accessible only from a single node, for example, in software-defined storage environments.

Figure 12:
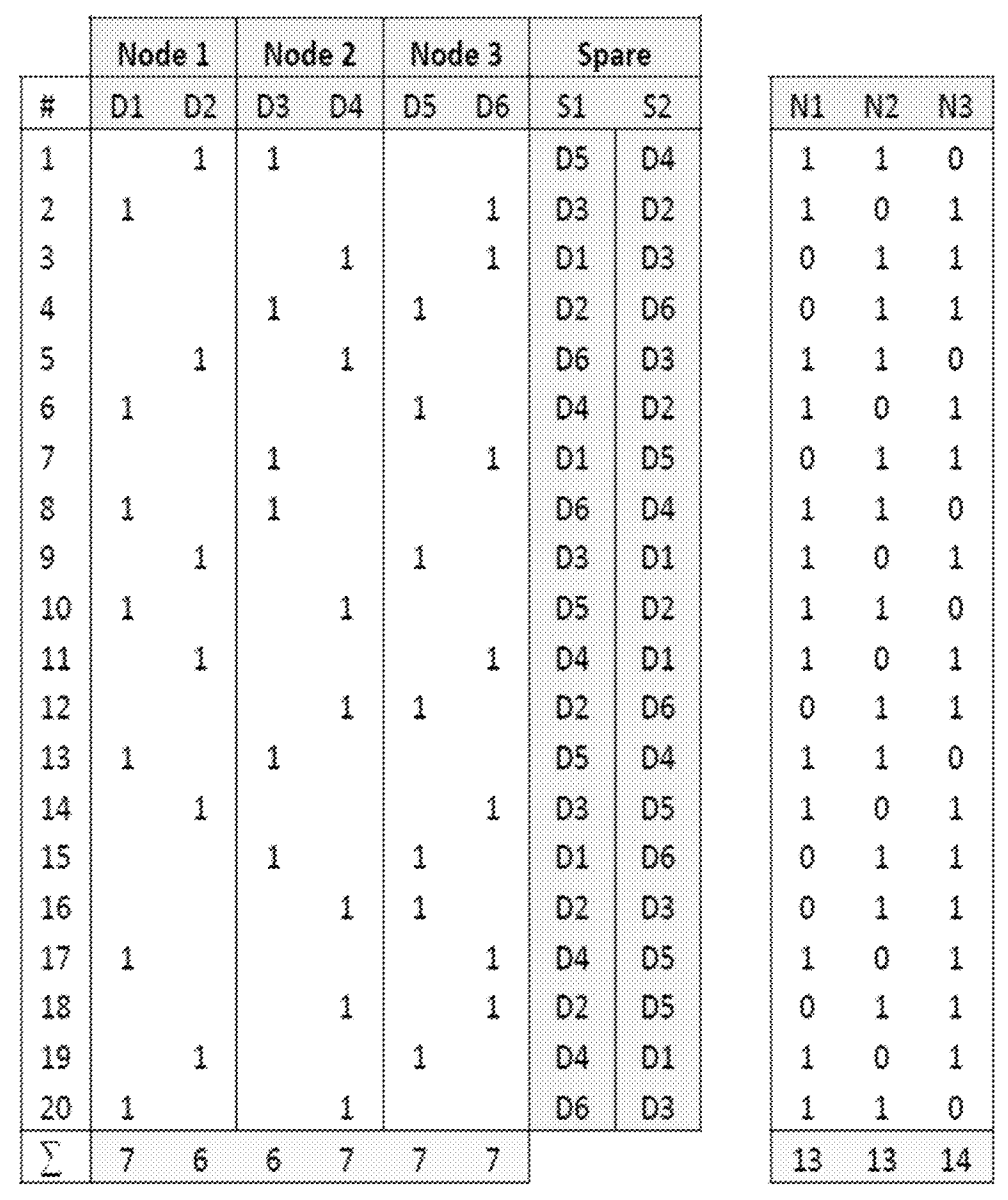

FIG. 12 shows an example allocation table in which no two blocks in a stripe are allocated from the same node. Additionally, there are only two blocks per stripe in this example, instead of the three blocks per stripe in the allocation table of FIG. 8. The reason for this is to create a situation in which none of the stripes spans all of the nodes.

FIG. 13 shows an example reserve table for the case of a single device or node failure. Note that D1 requires three blocks for a single failure (upper MAX row) and four blocks for a single node failure (lower MAX row).

FIG. 14 shows an example reserve table for the case of dual device and node failure. The reserve table of FIG. 14 has the same structure as the reserve table of FIG. 9. The primary difference is that the failure combinations are different, in that they are node-device not device-device as in FIG. 9. Considering by way of example the case where node N1 and device D3 have failed, the required spare capacity for another device, illustratively device D5, is determined as follows. As a first level spare device, D5 must contain three spare blocks corresponding to rows (1, 10, 13) in the allocation table of FIG. 12. As a second level spare device, D5 must contain 2 spares corresponding to rows (7, 17) in the allocation table of FIG. 12.

When allocating a new stripe, for example, the stripe corresponding to row 20 in the allocation table of FIG. 12, the combinations are calculated and added to the tracked metadata. In the case of row 20, there are the following combinations of failures:

1. Single—Add to S1 (which is D6):
   (a) D1/N1, D4/N2
2. Dual—Add to S2 (which is D3):
   (a) 2 Data: {N1, D4}, {N2, D1}
   (b) 1 Data and S1: {D1, N3}, {D4, N3}, {N1, D6}, {N2, D6}

The total number of spares required per failure combination is given in the reserve table of FIG. 14 in the column group titled "Dual Failure Spare." As in the FIG. 9 example, given the spare capacity required for all spare levels, the required spare capacity per device is calculated. The values are the summation of all the individual spare levels:

Dual Failure Spare=First Spare Level+Second Spare Level

The amount of spare capacity to reserve per device is the maximum of each column in the "Dual Failure Spare" column group. Accordingly, for devices D1, D2, D3, D4, D5 and D6, the corresponding numbers of spare blocks reserved are 6, 7, 7, 7, 7 and 6, respectively, as shown in the MAX line of the "Dual Failure Spare" column group.

As in other examples disclosed herein, the examples of FIGS. 8 through 14 use stripes and blocks as allocation units, but this is by way of illustrative example only, and different allocation units can be used in other embodiments. For example, an allocation unit can be larger than a single RAID stripe, depending on various aspects of the RAID design. Illustrative embodiments can therefore be adapted in a straightforward manner for use with these and other such larger allocation units.

Additionally or alternatively, other aspects of the illustrative embodiments can be varied. For example, although the examples of FIGS. 8 through 14 utilize two spare levels, with two spare devices allocated to each stripe, higher numbers of spare levels, with corresponding higher numbers of spare device allocated to each stripe, can be used in other embodiments. Also, any RAID arrangement or combination of RAID arrangements may be used. Accordingly, it is to be appreciated that the particular RAID arrangements illustrated in FIGS. 8 through 14 are examples only, and should not be viewed as limiting in any way. A wide variety of other RAID arrangements may be configured to guarantee sufficient capacity for RAID rebuild using the techniques disclosed herein.

Moreover, the above-described algorithms and corresponding operations associated with guaranteeing sufficient capacity for RAID rebuild are presented by way of illustrative example only, and should not be viewed as limiting in any way. Additional or alternative operations can be used in other embodiments.

Again, references to "disks" in the context of RAID herein are intended to be broadly construed, and should not be viewed as being limited to disk-based storage devices. For example, the disks may comprise SSDs, although it is to be appreciated that many other storage device types can be used.

Illustrative embodiments of a storage system with functionality for guaranteeing sufficient capacity for RAID rebuild in a storage system as disclosed herein can provide a number of significant advantages relative to conventional arrangements.

For example, some embodiments disclosed herein provide RAID arrangements in which spare blocks are reserved for storage devices in a manner that ensures that a rebuild process initiated responsive to a failure of one or more of the storage devices is guaranteed to have sufficient available storage device capacity to complete the rebuilding of the blocks of the one or more failed storage devices.

Advantageously, such techniques in illustrative embodiments herein can guarantee sufficient capacity to complete the rebuild process, while also being computationally simple, as well as highly efficient in that only at or near minimum amounts of capacity need to be reserved for rebuild within the storage system.

Moreover, the disclosed techniques in illustrative embodiments overcome additional drawbacks of conventional approaches. For example, some embodiments can be used for any type of RAID arrangement, including those involving combinations of multiple instances of distinct RAID approaches, such as a mixture of multiple distinct RAID types over the same set of storage devices, or a mixture of multiple stripe sets of different instances of one RAID type over the same set of storage devices.

Illustrative embodiments disclosed herein provide efficient mechanisms to guarantee sufficient capacity in these and other situations in which allocation of blocks to stripes cannot be predetermined, and in numerous other demanding RAID arrangements, including those involving parity RAID techniques and/or non-parity RAID techniques.

Accordingly, illustrative embodiments provide advantages over conventional techniques that utilize static allocation policies or "best efforts" policies. These and other conventional techniques cannot guarantee sufficient capacity for a wide range of different RAID arrangements or combinations of such arrangements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for guaranteeing sufficient capacity for RAID rebuild in a storage system will now be described in greater detail with reference to FIGS. 15 and 16. Although described in the context of system 100, these platforms may also be used to implement at least portions of other information processing systems in other embodiments.

Figure 15:
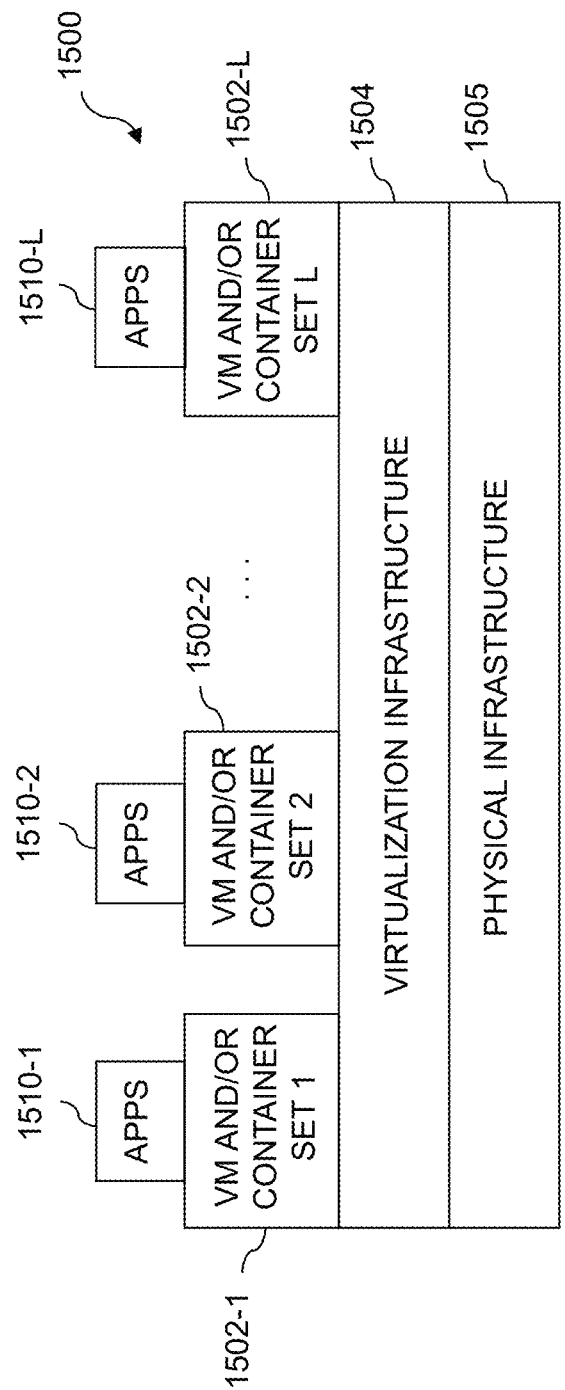
FIGS. 15 and 16 show examples of processing platforms that may be utilized to implement at least a portion of an information processing system in illustrative embodiments.
Figure 16:
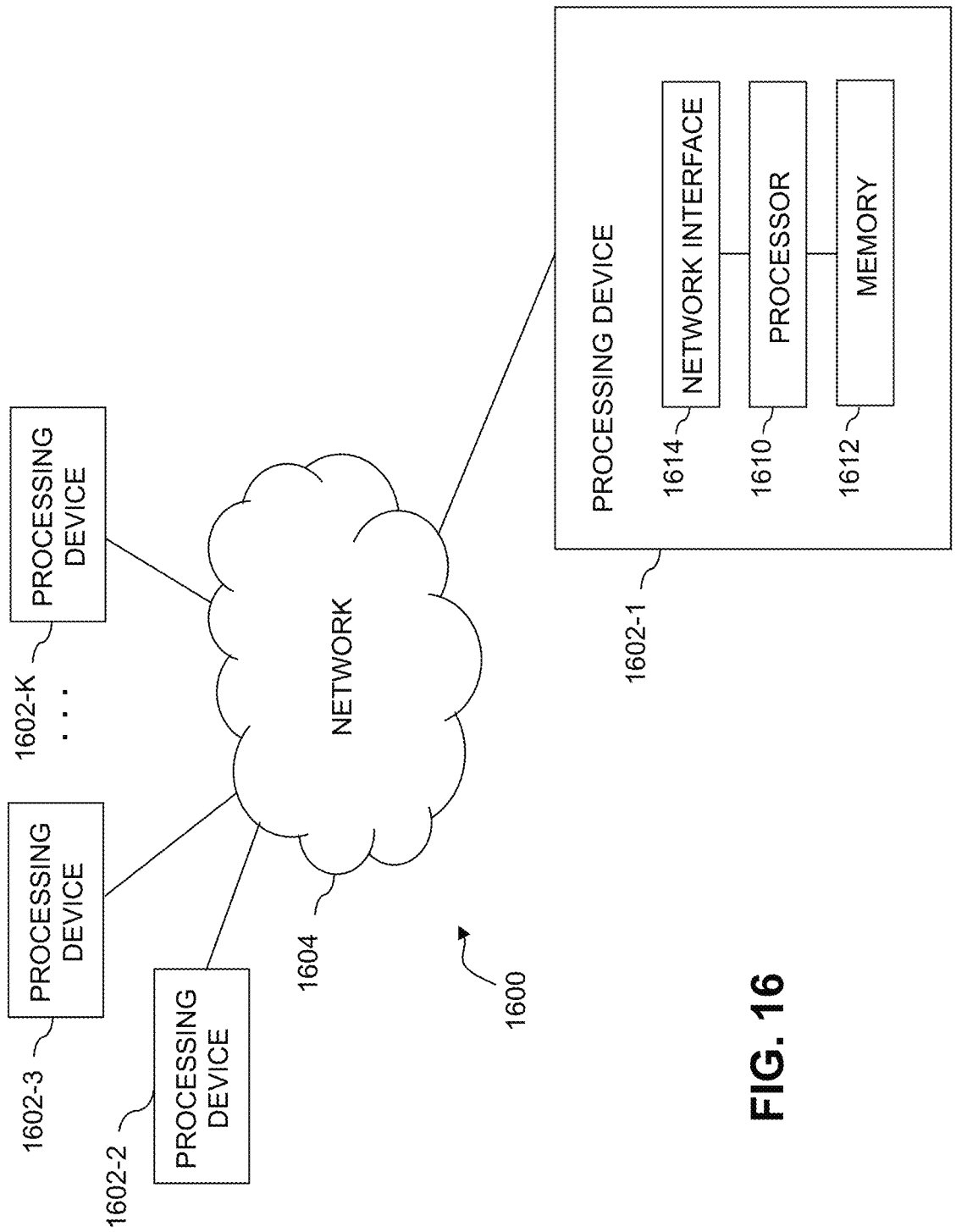

FIG. 15 shows an example processing platform comprising cloud infrastructure 1500. The cloud infrastructure 1500 comprises a combination of physical and virtual processing resources that may be utilized to implement at least a portion of the information processing system 100. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. Such implementations can provide at least portions of the functionality described herein using one or more processes running on a given one of the VMs. For example, each of the VMs can implement logic instances and/or other components supporting the disclosed functionality for guaranteeing sufficient capacity for RAID rebuild in the storage system 102.

A hypervisor platform may be used to implement a hypervisor within the virtualization infrastructure 1504. Such a hypervisor platform may comprise an associated virtual infrastructure management system. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system. Such implementations can also provide at least portions of the functionality described herein. For example, a container host device supporting multiple containers of one or more container sets can implement logic instances and/or other components supporting the disclosed functionality for guaranteeing sufficient capacity for RAID rebuild in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock© converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for guaranteeing sufficient capacity for RAID rebuild in a storage system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, RAID arrangements, storage controllers, stripe configuration logic, parity computation logic, device rebuild logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage system being configured:
to establish a redundant array of independent disks (RAID) arrangement comprising a plurality of stripes, with each of the plurality of stripes comprising a plurality of blocks, the blocks being distributed across multiple ones of the storage devices; and
in conjunction with establishment of the RAID arrangement:
for each of the plurality of stripes, to designate multiple ones of the storage devices as respective spare devices for that stripe;
for each of the storage devices, to determine numbers of the stripes for which that storage device is designated as a spare device for respective ones of the other storage devices in each of multiple spare levels and for each of multiple failure combinations; and
to reserve a particular number of spare blocks for each of the storage devices based at least in part on the determined numbers of the stripes for which that storage device is designated as a spare device for respective ones of the other storage devices across the multiple spare levels and the multiple failure combinations.

2. The apparatus of claim 1 wherein the RAID arrangement comprises a distributed RAID arrangement in which a total number of blocks per stripe is less than a total number of the storage devices over which the blocks of the plurality of stripes are distributed.

3. The apparatus of claim 1 wherein the RAID arrangement comprises at least one parity RAID arrangement supporting recovery from a failure of at least one of the plurality of storage devices and wherein a given one of the stripes comprises a plurality of data blocks and one or more parity blocks.

4. The apparatus of claim 1 wherein the storage system is further configured to store stripe metadata indicating for each of the stripes the multiple ones of the storage devices that are designated as respective spare devices for that stripe.

5. The apparatus of claim 4 wherein the stripe metadata indicating for each of the stripes the multiple ones of the storage devices that are designated as respective spare devices for that stripe comprises an allocation table, the allocation table comprising a plurality of entries for respective ones of the stripes with each such entry comprising identifiers of the storage devices that are designated as respective spare devices for that stripe.

6. The apparatus of claim 1 wherein the storage system is further configured to store stripe metadata indicating for each of the storage devices the determined numbers of the stripes for which that storage device is designated as a spare device for respective ones of the other storage devices in each of multiple spare levels and for each of multiple failure combinations.

7. The apparatus of claim 6 wherein the stripe metadata indicating for each of the storage devices the determined numbers of the stripes for which that storage device is designated as a spare device for respective ones of the other storage devices in each of multiple spare levels and for each of multiple failure combinations comprises a reserve table, the reserve table comprising a plurality of entries for respective ones of the storage devices with each such entry comprising the determined numbers of the stripes for which that storage device is designated as a spare device for respective ones of the other storage devices in each of multiple spare levels and for each of multiple failure combinations.

8. The apparatus of claim 1 wherein reserving a particular number of spare blocks for each of the storage devices based at least in part on the determined numbers of the stripes for which that storage device is designated as a spare device for respective ones of the other storage devices across the multiple spare levels and the multiple failure combinations comprises:
summing the determined numbers for the storage device across the spare levels to generate resulting sums for respective ones of the failure conditions;
determining a highest one of the resulting sums across the respective ones of the failure conditions; and
reserving a particular number of spare blocks for the storage device that is greater than or equal to the highest one of the resulting sums.

9. The apparatus of claim 1 wherein designating multiple ones of the storage devices as respective spare devices for a given one of the stripes comprises designating at least first and second storage devices as respective first and second spare devices for the given stripe, the first and second storage devices corresponding to respective first and second spare levels of the multiple spare levels, and wherein a first failure impacting the given stripe results in utilization of a spare block of the first spare device and a second failure impacting the given stripe results in utilization of a spare block of the second spare device.

10. The apparatus of claim 1 wherein the failure combinations comprise respective different sets of two or more of the storage devices.

11. The apparatus of claim 1 wherein different ones of the storage devices are implemented on different ones of a plurality of nodes of a distributed storage system.

12. The apparatus of claim 11 wherein the failure combinations comprise different combinations of one of the storage devices and one of the nodes.

13. The apparatus of claim 1 wherein the storage system is further configured:
to detect a failure of at least one of the storage devices; and
responsive to the detected failure, to initiate a rebuild process to reconstruct blocks of the one or more failed storage devices utilizing the blocks of other ones of the storage devices;
wherein the rebuild process utilizes at least a subset of the reserved spare blocks of respective ones of the non-failed storage devices.

14. The apparatus of claim 1 wherein the reserved spare blocks are sufficient in number to guarantee that a rebuild process initiated responsive to a failure of one or more of the storage devices has sufficient available storage device capacity to reconstruct the blocks of the one or more failed storage devices.

15. A method for use in a storage system comprising a plurality of storage devices, the method comprising:
establishing a redundant array of independent disks (RAID) arrangement comprising a plurality of stripes, with each of the plurality of stripes comprising a plurality of blocks, the blocks being distributed across multiple ones of the storage devices; and
in conjunction with establishment of the RAID arrangement:
for each of the plurality of stripes, designating multiple ones of the storage devices as respective spare devices for that stripe;
for each of the storage devices, determining numbers of the stripes for which that storage device is designated as a spare device for respective ones of the other storage devices in each of multiple spare levels and for each of multiple failure combinations; and
reserving a particular number of spare blocks for each of the storage devices based at least in part on the determined numbers of the stripes for which that storage device is designated as a spare device for respective ones of the other storage devices across the multiple spare levels and the multiple failure combinations.

16. The method of claim 15 wherein reserving a particular number of spare blocks for each of the storage devices based at least in part on the determined numbers of the stripes for which that storage device is designated as a spare device for respective ones of the other storage devices across the multiple spare levels and the multiple failure combinations comprises:
summing the determined numbers for the storage device across the spare levels to generate resulting sums for respective ones of the failure conditions;
determining a highest one of the resulting sums across the respective ones of the failure conditions; and
reserving a particular number of spare blocks for the storage device that is greater than or equal to the highest one of the resulting sums.

17. The method of claim 15 wherein designating multiple ones of the storage devices as respective spare devices for a given one of the stripes comprises designating at least first and second storage devices as respective first and second spare devices for the given stripe, the first and second storage devices corresponding to respective first and second spare levels of the multiple spare levels, and wherein a first failure impacting the given stripe results in utilization of a spare block of the first spare device and a second failure impacting the given stripe results in utilization of a spare block of the second spare device.

18. A computer program product comprising a non-transitory processor-readable storage medium having stored therein program code of one or more software programs, wherein the program code when executed by a processor of a storage system comprising a plurality of storage devices, causes the storage system:
to establish a redundant array of independent disks (RAID) arrangement comprising a plurality of stripes, with each of the plurality of stripes comprising a plurality of blocks, the blocks being distributed across multiple ones of the storage devices; and
in conjunction with establishment of the RAID arrangement:
for each of the plurality of stripes, to designate multiple ones of the storage devices as respective spare devices for that stripe;
for each of the storage devices, to determine numbers of the stripes for which that storage device is designated as a spare device for respective ones of the other storage devices in each of multiple spare levels and for each of multiple failure combinations; and
to reserve a particular number of spare blocks for each of the storage devices based at least in part on the determined numbers of the stripes for which that storage device is designated as a spare device for respective ones of the other storage devices across the multiple spare levels and the multiple failure combinations.

19. The computer program product of claim 18 wherein reserving a particular number of spare blocks for each of the storage devices based at least in part on the determined numbers of the stripes for which that storage device is designated as a spare device for respective ones of the other storage devices across the multiple spare levels and the multiple failure combinations comprises:
summing the determined numbers for the storage device across the spare levels to generate resulting sums for respective ones of the failure conditions;
determining a highest one of the resulting sums across the respective ones of the failure conditions; and
reserving a particular number of spare blocks for the storage device that is greater than or equal to the highest one of the resulting sums.

20. The computer program product of claim 18 wherein designating multiple ones of the storage devices as respective spare devices for a given one of the stripes comprises designating at least first and second storage devices as respective first and second spare devices for the given stripe, the first and second storage devices corresponding to respective first and second spare levels of the multiple spare levels, and wherein a first failure impacting the given stripe results in utilization of a spare block of the first spare device and a second failure impacting the given stripe results in utilization of a spare block of the second spare device.

* * * * *